(12) United States Patent
Hayter

(10) Patent No.: US 8,407,768 B1
(45) Date of Patent: *Mar. 26, 2013

(54) DATA AND APPLICATION ACCESS COMBINED WITH COMMUNICATION SERVICES

(75) Inventor: Mark Hayter, Menlo Park, CA (US)

(73) Assignee: Google Inc., Mountain View, CA (US)

(*) Notice: Subject to any disclaimer, the term of this patent is extended or adjusted under 35 U.S.C. 154(b) by 431 days.

This patent is subject to a terminal disclaimer.

(21) Appl. No.: 12/694,986

(22) Filed: Jan. 27, 2010

(51) Int. Cl.
*H04L 29/06* (2006.01)
(52) U.S. Cl. .......................................................... 726/5
(58) Field of Classification Search ........................ None
See application file for complete search history.

(56) References Cited

U.S. PATENT DOCUMENTS

| | | | | |
|---|---|---|---|---|
| 2003/0069874 | A1* | 4/2003 | Hertzog et al. | 707/1 |
| 2005/0138137 | A1* | 6/2005 | Encarnacion et al. | 709/217 |
| 2007/0169115 | A1* | 7/2007 | Ko et al. | 717/174 |
| 2008/0268766 | A1* | 10/2008 | Narkmon et al. | 455/1 |
| 2010/0304731 | A1* | 12/2010 | Bratton et al. | 455/420 |
| 2011/0113485 | A1* | 5/2011 | Little et al. | 726/19 |
| 2011/0176675 | A1* | 7/2011 | Hughes et al. | 380/44 |

* cited by examiner

*Primary Examiner* — William Goodchild
(74) *Attorney, Agent, or Firm* — Lerner, David, Littenberg, Krumholz & Mentlik, LLP

(57) ABSTRACT

An apparatus conveniently provides a user with access to applications and data that the user accesses on other devices in a secure and authenticated manner. The apparatus detects the presence of a second device, such as a mobile phone. The apparatus authenticates a user based at least on identifying information provided by the second device. The apparatus locates one or more applications based on resource access information provided by the second device. While the second device remains present, upon authenticating the user, and further upon successfully locating the one or more applications, the apparatus provides the user with access to the one or more applications. User data for the one or more applications is made available from the second device and/or a server. The data is synchronized across all sources. The data is encrypted at the apparatus, and rendered unreadable when the second device is no longer present.

21 Claims, 12 Drawing Sheets

DATA AND APPLICATION ACCESS COMBINED WITH COMMUNICATION SERVICES

CROSS-REFERENCE TO RELATED APPLICATIONS

This application is related to U.S. patent application Ser. No. 12/695,003 filed Jan. 27, 2010, also entitled "Data and Application Access Combined with Communication Services," by Hayter, et al., the entire contents of which are hereby incorporated by reference for all purposes as if fully set forth herein.

FIELD OF THE INVENTION

Embodiments of the invention described herein relate generally to centralized data and application access, and, more specifically, to techniques for providing access to data and applications based upon information provided by a mobile device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today's users may have several different computing devices through which they access data and applications—for example, a desktop computer, a laptop computer, and a mobile phone. Many of these devices also store local data, such as word-processing files, presentations, email, and calendar and contact databases. For example, some mobile phones known as "smartphones" contain one or more microprocessors powerful enough to run applications such as email, web browsing, personal information management (e.g., maintaining and updating a calendar and a contact database), and many others. Examples of smartphones include the Blackberry series from Research In Motion, Ltd., and the iPhone from Apple, Inc. At the same time, the user may access the same data at counterpart applications on one or more desktop or notebook computers.

The problem then arises of how to keep all of this information available in synchronized form at each of the devices through which the user accesses data and applications. For example, if the user updates a locally stored word-processing file or contact database on one device, the user may prefer that the updated information also be available on the other devices so that regardless of which device is being used, the user always accesses the most recent version of his or her data. However, for various reasons, it is often impractical or undesirable to persistently synchronize data between all of the devices a user might use.

The use of thin clients, where information is stored centrally, can simplify synchronization problems to some extent. For example, users may utilize web browsers, remote desktop clients, and/or other thin clients to access externally hosted applications that rely on centrally stored data. But thin-clients create other challenges. For example, thin-client users expect the same fast responses to their commands as they experience when data is stored and computation is performed locally. Therefore, some otherwise stateless thin-client environments improve response time by storing frequently used data on the thin client device itself. However, this approach introduces security risks when the user steps away from the thin-client device—for example, if the device contains nonvolatile storage that could be physically stolen and copied.

In all of these environments, various forms of identity verification and authentication are used to ensure that only authorized users are given access to particular applications and data. For example, a user will often "log in" by presenting credentials by which the user may be authenticated. However, many existing authentication techniques are highly vulnerable to security risks, such as password theft. Moreover, some users find it inconvenient to remember and constantly enter credentials at each of their devices (and in some cases, for each of their applications).

Various approaches to address the afore-mentioned and other issues have been described in, for example, U.S. Pat. No. 7,346,689, U.S. Pat. No. 6,654,784, U.S. Pat. No. 5,983,273, U.S. Pat. No. 5,889,942, and "Above the Clouds: A Berkeley View of Cloud Computing," M. Armbrust et al., Technical Report No. UCB/EECS-2009-28, Electrical Engineering and Computer Sciences Department, University of California at Berkeley, Feb. 10, 2009, http://www.eecs.berkeley.edu/Pubs/TechRpts/2009/EECS-2009-28.html, the entire contents of all of which are hereinafter incorporated by reference for all purposes as if fully set forth herein. However, for a number of reasons, other approaches are desirable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
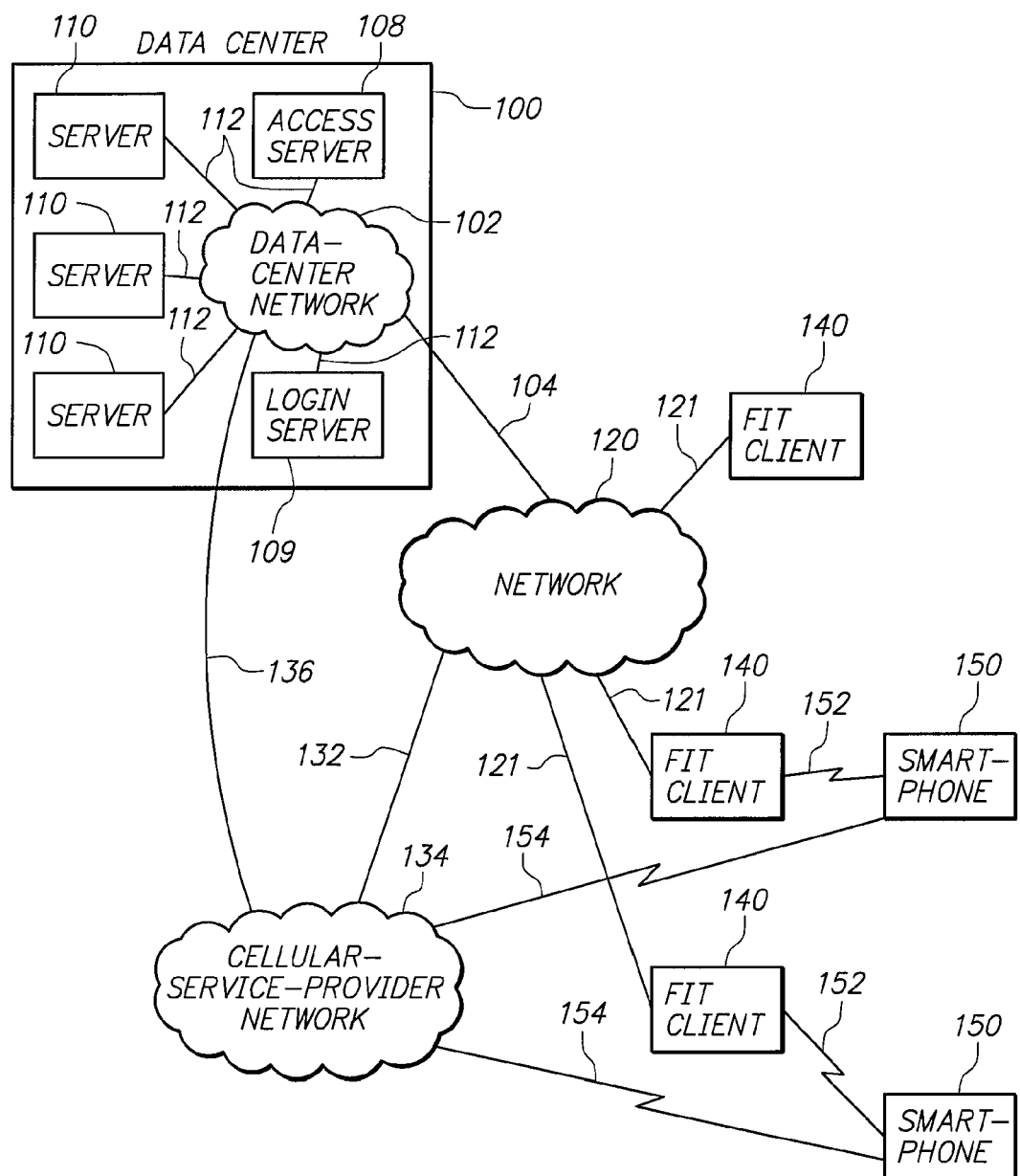
FIG. 1 shows the position and connections of a fit-client device within a system and network environment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0. | General Overview |
| 2.0. | System and Network Environment |
| 3.0. | Functional Overview |
| 4.0. | Fit-Client Hardware Architecture |
| 5.0. | Fit-Client Logical Architecture |
| 6.0. | Data Partitioning and Synchronization |
| 7.0. | Application Partitioning |
| 8.0. | Resource Location |
| 9.0. | Authentication and Presence Detection |
| 10.0. | Data Security |
| 11.0. | Data Storage and Synchronization |
| 12.0. | Telephony Features |
| 13.0. | Example Desktop Terminal Embodiment |
| 14.0. | Example Desktop Communicator Embodiment |
| 15.0. | Example Notepad Embodiment |
| 16.0. | Implementation Mechanism-Hardware Overview |
| 17.0. | Extensions and Alternatives |

1.0. General Overview

Approaches, techniques, and mechanisms are disclosed for data and application access at an apparatus hereinafter known as a "fit client." According to an embodiment, the apparatus comprises one or more processors, a presence detection component, an authentication component, a resource location component, and an application component. The presence detection component is configured to detect the presence of a second device, such as a mobile phone. The authentication component is configured to authenticate a user based at least on identifying information provided by the second device. The resource location component is configured to locate one or more applications based at least on resource access information provided by the second device. The application component is configured to, while the second device remains in the presence of the apparatus, upon the authentication component successfully authenticating the user, and further upon the resource location component successfully locating the one or more applications, cause the one or more processors to provide the user with access to the one or more applications.

In an embodiment, user data for the one or more applications is made available to the apparatus via communications with the second device and/or a server. This data may be kept synchronized across both the fit client and its originating source. The data is kept secure at the fit client by encryption techniques, and rendered unreadable under conditions such as the removal of the second device from the presence of the apparatus, the lapsing of a certain amount of time, and so on. The data may be deleted, or the data may remain at the device, and the decryption key deleted.

In an embodiment, the apparatus conveniently provides the user with access to the same applications and data that the user accesses on other devices, including the second device, in a secure and authenticated manner.

Figure 11:
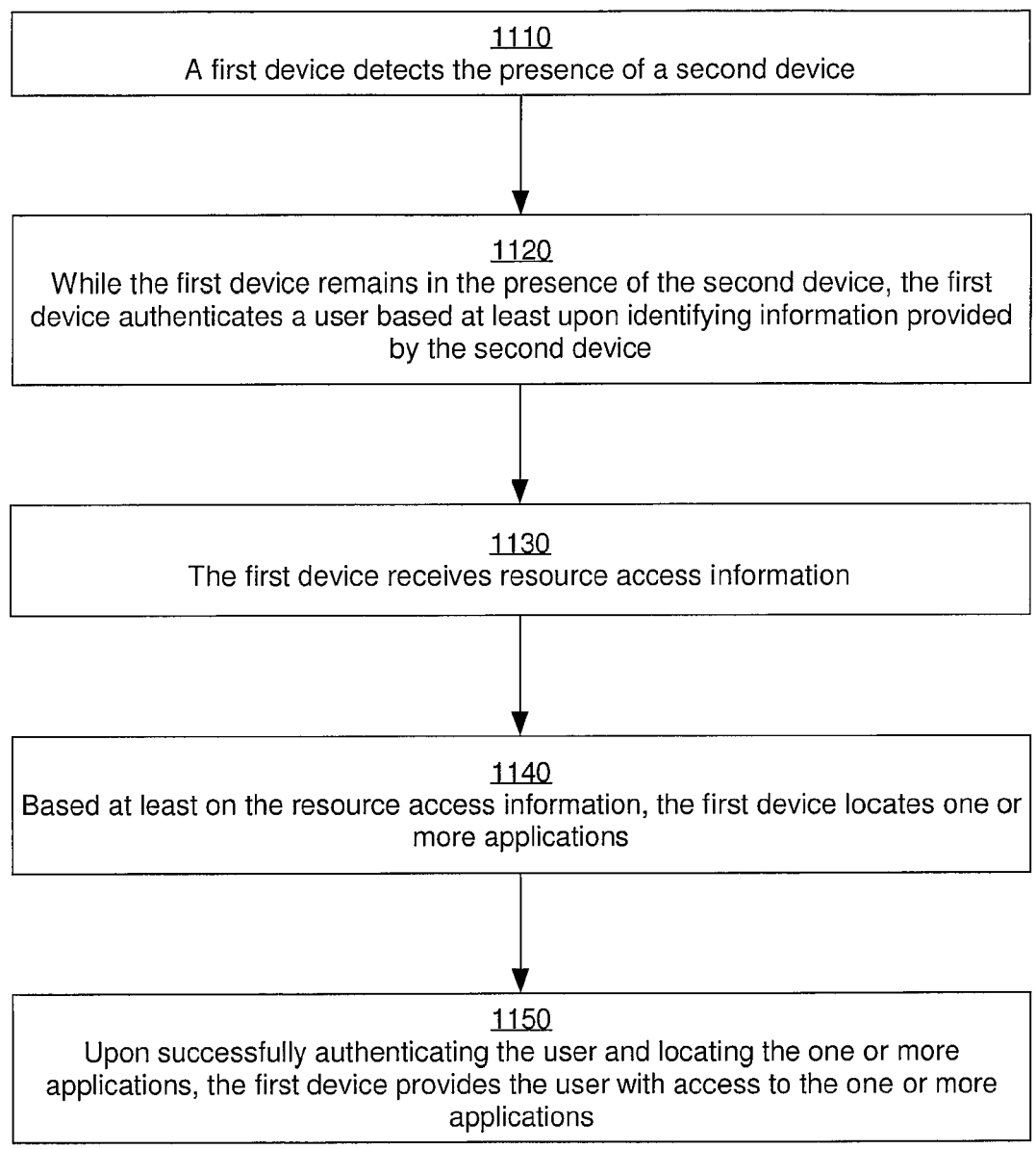
FIG. 11 is a flowchart illustrating a method for providing access to applications at a first device based on information provided by a second device.

FIG. 11 is a flowchart 1100 illustrating a method for providing access to applications at a first device, such as a desktop or notebook computing device, based on information provided by a second device, such as a mobile phone, according to an embodiment. At step 1110, a first device detects the presence of the second device through any of a variety of equipment, including communication interfaces and sensor devices.

At step 1120, while the first device remains in the presence of the second device, the first device authenticates a user based at least upon identifying information provided by the second device. For example, the second device may transmit to the first device user credentials or a device identifier. The user may then be authenticated based on this information.

At step 1130, the first device receives resource access information. The information may include, for example, data identifying the locations of and/or access mechanisms for one or more applications, user data relied upon by those one or more applications, credentials for those one or more applications, and so on. The information may be received from the second device. Such information may also be received as a result of one or more lookup operations based on the identifying information. For example, the first device may retrieve resource access information associated with one or more identifiers for the second device. The information may be retrieved from a local or external database.

At step 1140, based at least on the resource access information, the first device locates one or more of the applications. The applications may be local applications executable by the first device, or the applications may be external applications such as web applications or applications running on a remote system. In an embodiment, the resource access information includes executable code for one or more of the applications.

At step 1150, upon successfully authenticating the user and locating the one or more applications, the first device provides the user with access to the one or more applications. For example, the first device may execute some of the applications. As another example, the first device may launch a web browser and connect to some of the applications. As yet another example, the first device may launch a remote desktop client, connect to a remote system, and allow the user to interface with the applications at the remote system via the client.

FIG. 11 is a high-level diagram. Some of the many possible techniques for performing each of its constituent steps are described throughout the remainder of this application. The steps of flowchart 1100 are illustrative only, and may be performed in other orders than described above. Moreover, some of the steps may be omitted; while additional steps may be implemented.

In other aspects, the invention encompasses a computer apparatus and a computer-readable medium configured to carry out the foregoing steps.

2.0. System and Network Environment

In an embodiment, a client device (hereinafter referred to as a "fit client") can be used to provide computing and communication services to a user in a desktop or mobile environment, and connects through one or more networks to access centralized resources. FIG. 1 shows an embodiment of an example system and network environment. A fit client 140 connects to a network 120. In an enterprise application, the network 120 typically comprises one or more local-area networks based on Ethernet technology, as well as various wide-area network facilities to extend the network across arbitrary geographic distances.

The network 120 may be the public Internet, or the network may be a private network. The network 120 may have a combination of public and private components, in particular, at the edges, where it connects to the data center 100, the cellular-service provider network 134, and the fit client 140. The fit client 140 may use Virtual Private Network (VPN)

technology in its connections over the network 120. Any number of fit clients 140 may be provided. The data center 100 may be owned and operated by the owners of the fit clients 140, or the data center may be owned and operated by a third-party service provider.

The physical (ISO layer-1) connection 121 between the fit client 140 and the network 120 may be based on Fast (100 Mb/s) or Gigabit (1 Gb/s) wired Ethernet technology, but any suitable technology may be used, including Ethernet at other speeds, wireless Ethernet (Wi-Fi), and non-Ethernet technologies. Connection 121 may be capable of communicating messages via, for example, conventional IP packets (ISO layer 3) or any other suitable means, to and from the network. For example, a mobile fit client 140 could use WiMAX wireless technology, or cellphone wireless technology such as CDMA or GSM. Some embodiments may include multiple connections between the fit client 140 and the network 120, for example, a wired connection and a wireless connection. Some embodiments may include multiple networks 120 and a separate connection 121 between the fit client 140 and each network 120, for example, a "production network" and an "engineering network" or a "data network" and a "voice network." The network 120 may also use virtual local-area network (VLAN) technology to separate traffic into multiple categories on a single physical network 120.

In an embodiment, there are multiple fit clients 140, each with a connection 121 to the network 120. Some of the fit clients 140 have an associated smartphone 150, each of which communicates with its associated fit client 140 using a link 152. The link 152 may be a wired connection such as a cable or a set of contacts in a docking station, or a wireless connection such as Bluetooth or Wi-Fi Direct.

The network 120 provides communication between the fit clients 140 and a data center 100. The data center 100 has one or more servers 110 that provide services to the fit clients 140. Some servers may perform specialized functions, described later, for the fit client 140, such as the access server 108 and the login server 109. The servers 108, 109, 110 use connections 112 to communicate with each other and with other devices through a data center network 102. The data center network 102 can communicate with the network 120 using one or more connections 104, and with a cellular-service-provider's network 134 using one or more connections 136.

In an embodiment, each human user in the environment of FIG. 1 has a smartphone 150. In an embodiment, each smartphone 150 is uniquely associated with its respective user, meaning that the smartphone has been assigned or mapped exclusively to the user by an administrator or provider. Each user also has an associated computer account in the data center 100, which gives the user access to applications, private data, and shared data in the data center 100. For each user, the data center 100 maintains a home directory containing that user's private data.

Each smartphone 150 connects to the cellular-service provider's network 134 using wireless link 154. The cellular-service provider's network 134 connects to the network 120 using one or more links 132. The wireless link 154 is a conventional cellular link of an appropriate technology such as CDMA or GSM and provides for both voice and data communications. For data communications, the wireless link 154 and equipment in the cellular-service provider's network 134 support standard IP or other suitable communication between the smartphone 150 and devices connected to the network 120. Thus, the smartphones 150 can communicate with servers 110 in the data center 100 using their wireless links 154.

For simplicity, FIG. 1 shows each fit client 140 communicating with a single data center 100. However, it should be understood that a user may have associated computer accounts in many data centers, for example, one or more belonging to an employer and one or more for personal use at sites such as Yahoo!, Google, Facebook, and Shutterfly. Thus, the fit client 140 may communicate with multiple servers 110 in multiple data centers 100.

Communications among a fit client 140, the servers 108, 109, 110 in the data center 100, and the smartphone 150 may occur in any suitable form—for example, conventional ISO layer-4 and layer-5 protocols may be utilized to transport requests, responses, and general information such as global and user-specific applications, data, configuration and management information. Such protocols may include, without limitation, Transmission Control Protocol (TCP), User Datagram Protocol (UDP), File Transfer Protocol (FTP), GPRS Tunneling Protocol (GTP), Hypertext Transfer Protocol (HTTP), Remote Procedure Call (RPC), Stream Control Transmission Protocol (SCTP), Real-time Transport Protocol (RTP), RTP Control Protocol (RTCP), Real Time Streaming Protocol (RTSP), Session Initiation Protocol (SIP), Media Gateway Control Protocol (MGCP), Internet Message Access Protocol (IMAP), Post Office Protocol (POP), Simple Mail Transfer Protocol (SMTP), Simple Object Access Protocol (SOAP), and Extensible Messaging and Presence Protocol (XMPP), Communications among a fit client 140, the servers 110 in the data center 100, and the smartphone 150 may also use conventional ISO layer-4 and layer-5 protocols that provide security for transported information. Examples of such protocols include, without limitation, Secure Shell (SSH), Secure File Transfer Protocol (SFTP), Hypertext Transfer Protocol Secure (HTTPS), Secure HTTP (S-HTTP), and Secure Real-time Transport Protocol (SRTP).

The fit client 140, the smartphone 150, and other elements of the system depicted in FIG. 1 may have certain operating parameters whose values may be set at the discretion of a user or system administrator. For example, a fit client 140 may be permitted access to a particular VLAN of the network 120 but not to another VLAN, or a login server 109 may limit to a certain number how many failed login attempts a user can make before the login server 109 locks the user's account. The value of an operating parameter may be stored in the element that uses a particular parameter, and the value may be set by policy.

Several different methods of establishing policy are possible. One method is to allow a user or system administrator to set any desired value for a parameter at any time. Another method is to allow only a system administrator to set the value of a parameter, and only at the time that an element is first deployed. Another method is to provide a management server and software in the data center 100 whereby a system administrator can establish and maintain desired values for parameters on a global or per-user basis, whereby such server and software can store a parameter's value into an element when the element is first deployed, and update the value periodically in the event of changes to the element or to the desired parameter value.

Some policies may not set operating parameters per se, but may be inherent in the choice of programs and applications to deploy among the elements in FIG. 1, for example, an application that encrypts its data versus an application that does not encrypt its data. Different methods of establishing policy can be combined, with different methods being used for different elements or for different users. When policy is mentioned further herein, any operating parameter or method of operation that can be "set by policy" may be set by any such method.

3.0. Functional Overview

In this disclosure, the term "the data center 100" may refer to one or more servers 110 located in one or more data centers 100.

In an embodiment, a user turns on or enables a fit client 140, and identifies the user as an authorized user of the system by providing credentials which the fit client 140 authenticates with the data center 100 using the network 120. If present, the user's smartphone 150 may be used in the authentication process, as discussed later. The user is now "logged in."

After login, the fit client 140 loads data and/or applications pertaining to this user from the user's smartphone 150, if present, using the link 152. The data may include information that identifies additional data and applications for this user that can be accessed using the network 120. The identification may comprise a URI (Uniform Resource Indicator) such as a URL (Uniform Resource Locator) or URN (Uniform Resource Name) or both. Using the URI, the fit client 140 uses the network 120 to locate and load additional data and applications pertaining to this user from the data center 100 or elsewhere as in the network.

The user may now access applications using the fit client 140. Applications include anything that runs on a conventional PC (subject to their requirements for specific peripheral devices). However, while some applications may run locally on the fit client 140, others may run remotely in the data center 100, and have their inputs and outputs communicated from and to the fit client 140 over the network 120. For example, web browsing, document reading, and video decoding and viewing may run locally, while large business applications such as databases and manufacturing resource planning may run at the data center 100. All of the user's permanent information for these applications may reside in the data center 100, regardless of where the application runs.

Thus, in an embodiment the fit client 140 provides an environment where the user is unconcerned and generally doesn't notice whether applications are running locally or in the data center 100. In this manner, the user can enjoy universal access to that user's applications and data using any instance of a fit client 140; yet the user does not need to remember the details of how to access remote applications and data because the details are provided automatically by the smartphone 150.

Applications that run on the fit client 140 may also include some that normally run on the user's smartphone 150 when the smartphone is not connected to a fit client 140. The smartphone 150 may communicate the run-time software and the data for such applications to and from the fit client 140 using the link 152, and such applications may use the fit client's display, keyboard, and other devices.

At the same time that the fit client 140 runs applications, the fit client 140 provides voice and video telephony functions, which may include receiving calls, placing outgoing calls, transferring and conferencing calls, and voice and video telephony features and services. Since telephony functions run locally, performance is improved and network bandwidth and other resources are saved compared to prior-art thin-client environments where telephony functions run at the data center, as discussed later.

As described further herein, when a user is not using or not physically near the fit client 140, the data and applications are "locked" so that unauthorized users cannot access them. However, as set by policy, some or all telephony functions may remain accessible to anyone. This is an improvement over prior-art "softphone" applications on PCs, where a user must be logged in for telephony functions to be accessible. Instead, in embodiments that include a separate telephony keypad and handset (described later), the fit client 140 can be used as a conventional, familiar telephone at any time. In any case, when data and applications are locked, and after a time set by policy, any local copies of the user's data are rendered unreadable by anyone.

4.0. Fit-Client Hardware Architecture

Figure 2:
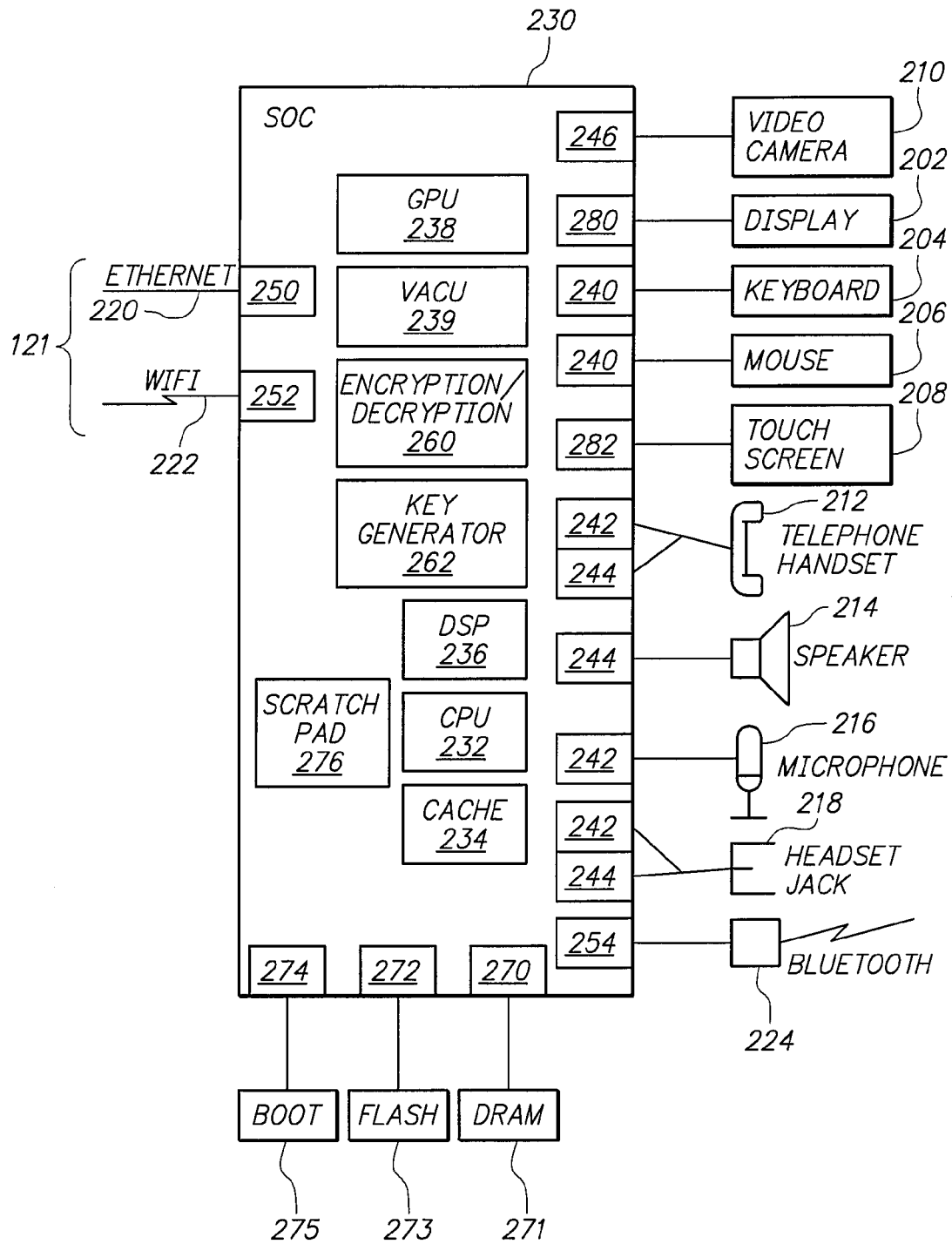
FIG. 2 shows hardware components of a fit-client device.

FIG. 2 is a block diagram of an example fit client 140. In an embodiment, fit client 140 comprises a microprocessor System-on-a-Chip 230 (SoC 230) and related interfaces which are described further herein. The fit client 140 in an embodiment comprises one or more displays 202, keyboard 204, and mouse or other pointing device 206. In an embodiment, fit client 140 comprises a telephony keypad/display or touch screen 208, video camera (webcam) 210, and a telephone handset 212, speakerphone-class speaker 214 and microphone 216, or telephone headset jack 218. In various embodiments, devices such as keyboard 204, mouse 206, and others may use a conventional USB interface 240 to connect to the fit client 140.

In an embodiment, fit client 140 has a wired Ethernet connection 220 and/or a wireless Ethernet (Wi-Fi) connection 222 to provide network connectivity. With reference to FIG. 1, the wired Ethernet connection 220 and/or the Wi-Fi connection 222 provides the network connectivity 121. In some embodiments, the connection 222 may be capable of acting as either a base station (access point) or as a client station depending on connectivity needs, and in other embodiments, the connection may always act as a client station. The fit client 140 may also have a wireless personal-area network connection to connect to the user's smartphone and other nearby devices. In an embodiment, the wireless personal-area network connection comprises a dedicated connection 224 using Bluetooth or Wi-Fi Direct. Alternatively, the connection 222 may be used for Wi-Fi Direct. In some embodiments, devices such as keyboard 204, mouse 206, and others may connect to the fit client 140 using the wireless personal-area network 222 or 224, instead of using a USB interface 240.

In an embodiment, fit client 140 comprises several types of memory. One or more banks of DRAM 271 provide working storage for programs and data. In an embodiment, the fit client 140 does not contain any conventional hard-drive storage. Rather, one or more flash memory chips or modules 273 provide nonvolatile storage for a native operating system, native applications and, in some embodiments, downloaded applications or cached data. A boot memory 275 provides the initial code that runs when power is first applied to the SoC 230 or when the SoC is reset. In some embodiments, the boot memory 275 may be contained within the SoC 230 or within the flash chip or module 273. In some embodiments, the SoC 230 may have a scratchpad RAM 276 to store data that needs to be accessed quickly, as well as data that, for security reasons, typically is not provided on the external pins of the device.

The fit-client 140 temporarily caches files and other information received from the data center 100 and/or the smartphone 150. In some embodiments, the cached information may be stored in flash memory chips or modules 273. In an embodiment, where the fit client 140 has full-time access to the network 120, any cached information that is somehow lost can be read from the data center 100 again using the network 120; in such embodiments, some or all of the cached information may be stored in DRAM 271.

In an embodiment, the fit client 140 includes a microprocessor SoC 230 comprising one or more Central Processing Units (CPUs) 232, memory cache(s) 234, and specialized functional units and interfaces, which may include one or more Digital Signal Processors (DSPs) 236, Graphics Processing Units (GPUs) 238, Video Acceleration and Codec Units (VACUs) 239, Universal Serial Bus (USB) interfaces 240, audio input 242 and audio output 244 interfaces, camera input interface 246, Ethernet interfaces 250, Wi-Fi interfaces 252, Bluetooth interfaces 254, bulk encryption and decryption units 260, security-key-generation units 262, DRAM interfaces 270, flash-memory interfaces 272, boot memory interfaces 274, scratchpad RAM 276, display interfaces 280, and/or touch-screen interfaces 282. In some embodiments, the SoC 230 may be a multi-chip set. In a particular embodiment, depending on the functional units and interfaces provided in SoC 230, some of the functional units and interfaces listed above may be provided on separate chips external to the SoC 230 shown in FIG. 2.

In an embodiment, SoC 230 includes data paths and direct-memory-access (DMA) controllers so that files and other information received from the data center 100 and/or the smartphone 150 can be encrypted by an encryption unit 260 when the data is first received and cached, and decrypted by a decryption unit 260 whenever the data needs to be used by the fit-client 140. The security key used in such operations may be generated by a security-key-generation unit 262 which, in some embodiments, may be a program running on a CPU 232 or a DSP 236, rather than being a separate hardware unit.

5.0. Fit-Client Logical Architecture

In an embodiment, power-on or reset, fit-client 140 begins operation on one of its CPUs 232 or DSPs 236, running boot logic stored in, for example a boot memory 275. In an embodiment, boot software loads the operating system and other software from nonvolatile storage 273 into DRAM 271, and then causes that software to begin execution. In an embodiment, the boot logic uses a secure-boot mechanism to ensure that only trusted software can loaded and run.

Figure 3:
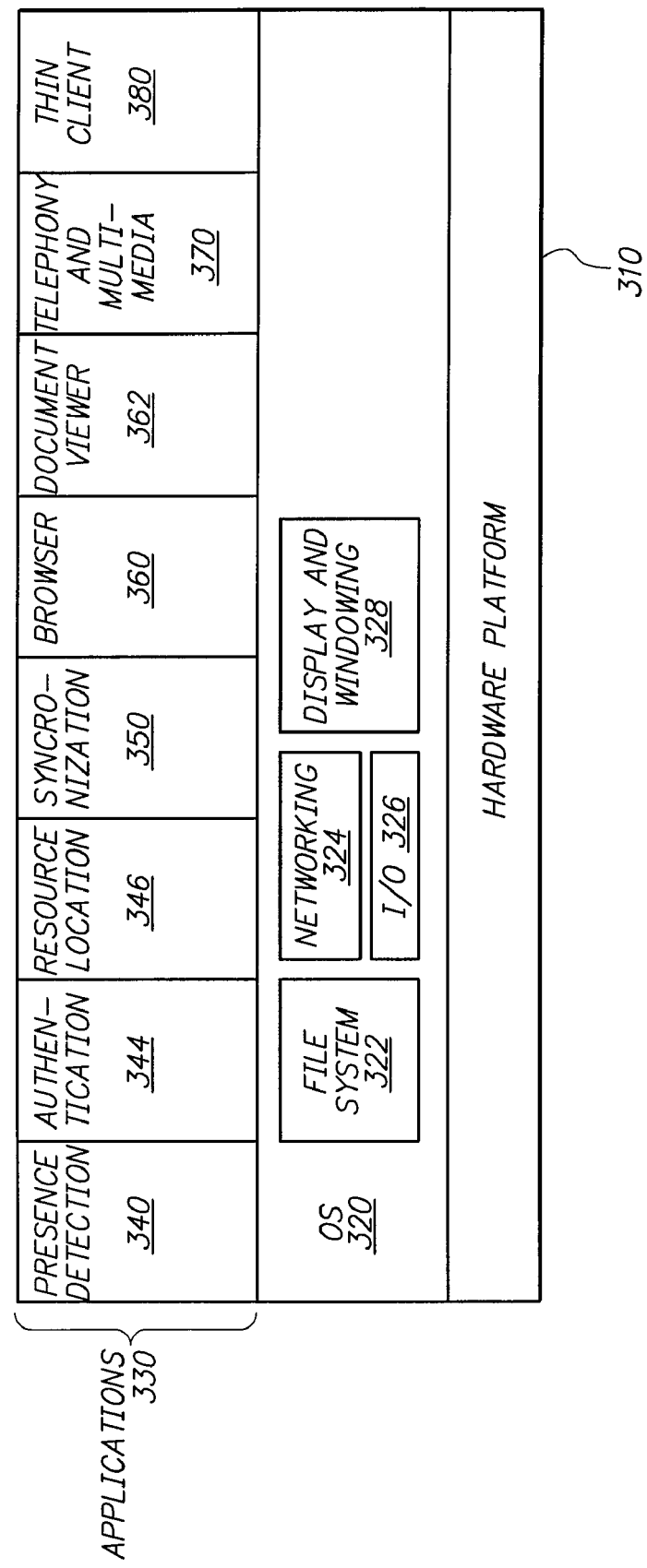
FIG. 3 shows logical components of a fit-client device.

In an embodiment, the operating system (OS) is a version of Linux. As shown in FIG. 3, the OS 320 is logically hosted on hardware platform 310, which comprises CPUs, interfaces, various functional units, and memories, such as SoC 230 and memories 271, 273, 275.

FIG. 3 illustrates various logical components of a fit client 140, according to an embodiment. In an embodiment, these components are implemented by one or more processors and/or other hardware components of the fit client 140 executing software or firmware based instructions for performing the various techniques described herein. In an embodiment, some or all of the components may execute higher-level software that is logically hosted on the OS; that is, the higher-level software obtains access to hardware resources by calling a driver that is part of the OS or obtains access to operating system resources by calling OS functions or methods. In some cases, the higher-level software may call the OS for permission to use the resources and/or for information on how to use the resources, such as addresses of registers, buffers and the like, and then access those resources directly. For example, rather than going through an OS driver, a voice application may access a DSP 236 directly or a video application may access a GPU 238 or VACU 239 directly.

The OS 320 includes a file-system component 322 which provides for storage and retrieval of information in files stored in the nonvolatile storage 273. With respect to user data, in an embodiment the fit client 140 may be stateless, while capable of temporarily caching user data in files accessed by the file-system component 322. Also, nonvolatile storage 273 stores the images of the OS 320 and other local fit-client software on a long-term basis in files managed by the file-system component 322. The OS 320 and/or other software images may be read from files and loaded into DRAM 271 for execution as needed.

The file-system component 322 includes the ability to encrypt information as the information is stored in files, using an encryption unit 260. The file-system component 322 in an embodiment also includes the ability to decrypt encrypted files as they are read, using a decryption unit 260. In an embodiment, the same unit 260 can be used for encryption or decryption. All user data, such as cached user data and user credentials, is encrypted as the data is stored in files, and decrypted as the data is read. The file-system component may also encrypt other files, such as the OS image, application programs, and OS data, as determined on a file-by-file basis.

In an embodiment, OS 320 hosts other components, including networking component 324 for providing communication through Ethernet interfaces 250, Wi-Fi interfaces 252, and Bluetooth interfaces 254; input/output (I/O) component 326 for providing access to I/O interfaces such as USB 240, audio input 242, and audio output 244; and display and windowing component 328 for processing information possibly using a GPU 238 and/or a VACU 239, and using a display interface 280 or a touchscreen interface 282 to display the information on a display 202 or a touch screen 208. The OS 320 may include other components which are beyond the scope of the present disclosure.

As shown in FIG. 3, application component 330 is at a level above the OS 320, and relies upon drivers and services provided by the OS 320.

In an embodiment, the presence-detection component 340 monitors one or more hardware resources to determine whether or not the user of the fit client 140 is physically present at the current time, and enables or causes certain activities based on user presence. In an embodiment, authentication component 344 controls whether a user is allowed to "log in" to the fit client 140; the authentication component communicates with both the data center 100 and the user's smartphone 150 to perform authentication operations. In an embodiment, resource-location component 346 is used to find and access that particular user's applications and data in the data center 100. In an embodiment, synchronization component 350 is used to maintain consistency between data stored in the user's smartphone 150 and in the data center 100.

In an embodiment, browser 360 runs locally on the fit client 140. In an embodiment, the browser 360 runs on a local CPU 232 under the control of the OS 320; the user's inputs using the fit client's keyboard 204 and mouse 206 are sent, after any local processing, directly to a remote website; and the website's responses are sent directly to the browser 360 and are processed there. Local input processing includes gathering and editing words or lines, and more sophisticated operations, for example, using JavaScript. Local response processing includes display updates and performing computation and display operations, for example, using HTML, Java, JavaScript, Adobe Flash, and AJAX (Asynchronous Javascript And XML). Some processing may require certain user files to be accessed, such as bookmarks and cookies. Since the fit client 140 may be stateless, such processing may cause the needed files to be retrieved and cached or created automatically at the fit client, and synchronized with permanent versions in the smartphone 150 or in the user's home directory in the data center 100.

In an embodiment, document-viewer software 362 also is local application software. In an embodiment, document-viewer software 362 reads document files in one or more formats such as Adobe pdf, Microsoft Word format (doc, docx, or rtf), Microsoft PowerPoint format (ppt), or ISO/IEC Open Document Format, and causes displaying the document on a display 202. Since files are typically stored in the user's home directory in the data center 100, the fit client 140 typically retrieves the document file and caches a copy locally in DRAM 271 or nonvolatile memory 273, so that display operations can proceed quickly. Some document-viewer software 362 provides an annotation facility, so that the document can be "marked up," and the annotated copy can be saved. In this case, the document-reader software 362 modifies the local file copy, and saves the local file copy in the same file or a different file, as determined by the user, in the data center 100 when finished.

In an embodiment, voice and video telephony and other multimedia applications 370 run locally in the fit-client hardware and software environment. In an embodiment, with the cooperation of the OS 320, applications 370 may directly access some of the hardware resources of fit client 140, such as DSP 236, GPU 238, and VACU 239. Voice and video telephony applications 370 may use Voice-over-IP (VoIP) technology such as SIP (Session Initiation Protocol), RTP (Real-Time Transport Protocol), and H.323 (an umbrella recommendation from the ITU defining protocols for call signaling and control, multimedia transport and control, and bandwidth control for point-to-point and multi-point conferences). These applications may use I/O devices in the fit client 140, including the displays 202, keyboard 204, mouse 206, touchscreen 208, video camera 210, telephone handset 212, speakerphone-class speaker 214 and microphone 216, and telephone headset jack 218.

In an embodiment, applications may run remotely at the data center 100. In an embodiment, fit client 140 provides thin-client component 380 to support remote applications. In an embodiment, thin-client component 380 implements the client side of one or more protocols such as Teradici's PC-over-IP (PCoIP), Microsoft's Remote Desktop Protocol (RDP), and RealVNC's Virtual Network Computing (VNC) protocol.

6.0. Data Partitioning and Synchronization

In an embodiment, fit client 140 may be stateless with respect to the user's permanent information. That is, when a user is not using the fit client 140, the fit client does not store any of the data or other information (state) belonging to that user. In an embodiment, components of the user's state are stored in the user's home directory in the data center 100 or in the user's smartphone 150. While other embodiments may not necessarily employ such an approach, it should be noted that the approach outlined above may in some circumstances provide benefits such as:

1) The user can use any physical instance of the fit client to access his or her data and applications.

2) No user data typically is lost if the fit client is lost, stolen, or destroyed.

3) A thief or attacker cannot get access to sensitive user data that is permanently stored on the fit client, because none is stored.

4) The cost of and responsibility for reliable data storage are borne by the data center.

5) The user may have multiple home directories in multiple data centers for different activities and applications (e.g., work documents, personal photos, social networking), yet all can be readily accessed via the fit client.

In an embodiment, unlike prior approaches, a direct link 152 is between the fit client 140 and the smartphone 150. This allows the fit client 140 to obtain information from the smartphone 150 as well as from the data center 100. Further, using the link 152, the fit client 140 can use all of the information stored on the user's smartphone 150. Moreover, because the fit client 140 is also connected to the data center 100 via the network 120, the fit client can also synchronize the user's information with copies stored there.

In an embodiment, synchronization is a one-way operation comprising storing a backup copy of the information from the smartphone 150 in the user's home directory in the data center 100. In an embodiment, synchronization comprises updating a copy of the user's information in the data center 100 by a fit client 140 or other means while the smartphone 150 is "off-line." In this case, when the data center 100 detects that the phone is currently connected to a fit client 140, the data center pushes the updated information out to the smartphone 150 through the fit client 140.

In an embodiment, data center 100 may push such updates to the smartphone 150 through the cellular-service provider's network 134. However, users may prefer to have updates occur through the fit client 140, since the fit client can provide a richer environment including a larger display and applications that help the user resolve conflicts when information in the data center 100 and information stored on the smartphone 150 are found to be inconsistent.

Many types of user information may be stored in the data center 100. For example, large files such as word-processing documents, spreadsheets, presentations, and email archives may be stored in data center 100. The fit client 140 can access such information from the data center 100 using the network 120. If a copy of any such information is needed by the smartphone 150, the fit client 140 can transfer the information using the link 152, potentially reducing time and cost compared to a transfer through the cellular-service provider network 154.

In an embodiment, a benefit of the fit-client architecture is that it allows the user's information to be stored either in the data center 100 or in the smartphone 150 or both, as is most natural and appropriate for a particular type of information, while still providing universal access to such information. Some specific examples of information storage and synchronization for preferred embodiments are given later.

7.0. Application Partitioning

In an embodiment, the fit-client architecture can provide the user with the same experience as with using the desktop or mobile PC. At the same time, the fit-client architecture in various embodiments can provide centralization and statelessness, by storing the user's permanent information at the data center for reasons discussed previously. In an embodiment, low cost and low power consumption are provided and a fit client 140 can provide a replacement for existing, separate computation and communication devices. In an embodiment, application execution is partitioned between the data center 100 and the fit client 140.

In an embodiment, computationally and data intensive applications run at the data center 100. In an embodiment, fit client 140 does not require expensive and power-hungry Intel and AMD x86-family microprocessors or Microsoft's Windows operating system. Further, fit client 140 is not required to have large nonvolatile storage media (e.g., hard drives with capacities of hundreds of gigabytes).

In an embodiment, fit client 140 uses lower-cost and lower-power microprocessor systems-on-a-chip that typically use ARM, PowerPC, or MIPS microprocessors, and support capable yet inexpensive operating systems such as those based on open-source Linux. In an embodiment, higher-cost and higher-power fit clients 140 could use x86-based microprocessors and/or other operating systems such as Windows, WindowsCE, and Apple Mac OS X, and future SoCs based on the x86 and other architectures.

In an embodiment, fit client 140 hosts or runs a web browser 360, one or more document viewers 362, and thin-client component 380. In an embodiment, fit client 140 also supports voice and video component 370, which includes receiving and making voice and video phone calls. For example, open source applications for the Linux environment may be used, and commercial applications may be used for environments such as Windows, WindowsCE, and Apple Mac OS X.

Some applications may have a rich legacy including features, functions, and file formats, where users may have years of experience and hundreds or thousands of files and documents that have been created with these applications. For example, the Microsoft Office suite of applications includes a document editor (Word), a spreadsheet program (Excel), a presentation editor (PowerPoint), and an email and calendar program (Outlook). The fit-client architecture has at least three methods of providing these applications.

In an embodiment, a first method is to provide a similar application that runs locally on the fit client. For example, the open-source community through OpenOffice.org provides equivalents to Word, Excel, and PowerPoint, and Yahoo! Zimbra provides an equivalent to Outlook, all of which run in the Linux environment. In an embodiment, when such an application runs locally on the fit client 140, the user's permanent data (such as word-processing files, spreadsheets, presentations, email, and calendars) may be stored in the data center 100.

In an embodiment, a second method is for the application to run in the data center 100, and to present itself to the user in a web-browser window on the fit client 140. For example, the Google Apps suite includes applications equivalent to Word, Excel, Powerpoint, and Outlook that run in the data center, store the user's permanent data in the data center, and are accessed and operated through a web-browser window. Such applications typically use AJAX (Asynchronous Javascript And XML) methods to communicate with the web browser in the background, providing the perception of continuous and smooth operation even though most of the work is being done in the data center 100.

In an embodiment, a third method is to run the legacy application and to store the user's data on a virtual computer in the data center 100, and to use a remote-display protocol such as Microsoft's RDP to present the application on the fit client 140. In this case, the application is identical to the legacy application that may have run on the user's prior desktop or mobile computer; the user's keystrokes and other inputs at the fit client 140 are sent to the virtual computer running in the data center 100, and the results (mostly display updates) are sent back out to the fit client 140, using RDP or a similar protocol. The VNC system and VMware's View portfolio of products are other examples that provide this capability.

Certain legacy applications do not have an open-source or web-based version. In an embodiment, any such application can run on a virtual computer in the data center 100, and may be accessed by the user of a fit client 140 using RDP or a similar protocol as described for the third method above.

With the second and third methods described above, the fit client 140 receives information on where to find the application that it is going to run. Examples of applications that run in the data center 100 include email and calendar management (e.g., Microsoft Outlook), database programs (e.g., Oracle), and word processing (e.g., Microsoft Word). For the second method above, the fit client 140 receives the web address (URN or URL) of the application that is going to be accessed through the browser. For the third method, fit client 140 receives information for the RDP or similar protocol to identify the application and virtual computer to be used. In both cases, application resource location or identifying information can be stored in the user's smartphone 150, and delivered to the fit client 140 as described further herein.

Many useful applications have been developed for smartphones, and many users have come to rely on their smartphones as the primary device for running these applications, for example, contact database and calendar management. However, there are many times when the user would enjoy the benefits of a larger display and keyboard if these applications could be run in the desktop environment. In an embodiment, fit client 140 provides the capability of transferring data and also an application from the smartphone 150 to itself.

Since smartphone applications can be written using a portable, compile-on-the-fly language such as Java, in an embodiment one or more smartphone 150 applications run on the fit client 140 even though the fit client has a different CPU 232 and OS 320. The smartphone 150 application can be presented in a window on the display 202. Depending on the application, the window may be enlarged to have more pixels so that the user may work with more data that is possible with the limited display size of the smartphone 150.

Typical smartphone applications modify one or more data files that are stored in the smartphone 150, for example, a contact or calendar database. When a smartphone application is transferred to the thin client 140 for execution, a copy of one or more associated data files is also transferred. When the application completes execution, the thin client 140 transfers the modified data file(s) back to the smartphone 150 for permanent storage. At that time, the modified data file(s) may also be transmitted back to the data center 100 by the smartphone 150 or the fit client 140 for synchronization purposes.

In an embodiment, applications can run either in the data center 100 or on the fit client 140, whichever is appropriate to balance the competing goals of low cost and low power on one hand, and an excellent user experience on the other. Unlike prior-art devices, the fit client 140 is neither thick nor thin, but "fit" for its purpose.

8.0. Resource Location

In an embodiment, the fit client 140 establishes communication with the user's smartphone 150 and the user "logs in." In response, the fit client 140 uses resource-location component 346 to request information from the smartphone 150 on how to find and access that particular user's applications and data. The smartphone 150 responds by sending the fit client 140 one or more elements of access information including URLs, URNs, server names, file names, user credentials, methods (e.g., browser vs. RDP), and other information that may be used to access commonly used applications that run in the data center 100. Access information may include data identifying one or more helper applications that run on the fit client 140 and help the fit client locate other applications or information in the data center 100. In some embodiments, the access information stored in the smartphone 150 may be the URI of and access credentials for a server in the data center 100 that maintains access information for a particular user. The user's access information may be stored in one or more separate files, including a system registry, in the user's smartphone 150. Or, some or all of the access information may be stored in the smartphone in one or more keyring files, along with passwords and other credentials.

In some embodiments, access information may include one or more operating parameters whose values are set by policy. For example, access information may include a timeout value such that the fit client 140 is "locked" when the user is determined to be not present for a period greater than the timeout value. Access information may also include information that is used for security purposes, such as certificates and other information that identifies the user's organization.

In an embodiment, the resource-location component 346 receives from the user's smartphone 150 a unique identifier associated with smartphone 150. For example, the unique identifier could be the unique Bluetooth or MAC address that the smartphone 150 uses when communicating over the link 152. Smartphone 150 may have announced such an identifier when fit client 140 detected the presence of the smartphone 150, or the identifier may have been included in one or more messages that were sent across the link. The resource-location component 346 then uses the network 120 to send the unique identifier to an access server 108 in the data center 100. The access server 108 uses the unique identifier to look up the access information for the smartphone's user, and sends the access information to the resource-location component 346 on the fit client 140 using the network 120.

In this manner, unlike with prior art approaches, a user may enjoy universal access to his or her applications and data using any instance of a fit client 140; yet the user does not need to remember the details of how to access remote applications and data because the details are provided automatically by the data center 100 based on the identity of the user's smartphone 150. An additional benefit of this embodiment is that the access information stored in the data center may be centrally managed by the user's IT department, improving security and robustness compared to an environment where the user must remember or look for the location of applications and data and could be misdirected to hazardous locations by "phishing" schemes.

The fit client 140 may use any of a variety of methods and protocols to locate the access server 108, such as BOOTP (Bootstrap Protocol), DHCP (Dynamic Host Configuration Protocol), and LLDP (Link Layer Discovery Protocol). In some embodiments, the location of the access server 108 may be programmed into the nonvolatile memory 273 of the fit client 140 by an enterprise's IT department or by others when it is first installed in the enterprise. Although such a programmed location could be considered to constitute "state" in the otherwise stateless fit client 140, it is not the state of a particular user; rather, it is "global" configuration information that could be the same in all fit clients 140 deployed in a particular enterprise.

In an embodiment, the smartphone 150 need not be "smart" or even be a phone. The ability to provide a unique identifier exists in devices that have a digital wireless link 152 (such as Bluetooth), including conventional (non-smart) mobile phones, wireless headsets, and wireless computer mice. Thus, an embodiment can use a non-smartphone device 150 to provide the unique identifier; the device 150 is simply an "identifying device" that is uniquely associated with the user. In an embodiment, when a user has lost or forgotten his or her smartphone or other identifying device, a temporary identifying device may be used in which the access server 108 has been pre-configured to provide a default set of access information to anyone who logs in with that temporary identifying device. Using a management application in the data center 100, the user's normal set of access information may be assigned to the temporary identifying device.

9.0. Authentication and Presence Detection

When a user begins a computer session, the user may "log in" to authenticate his or her identity, establishing the right to view, create, and modify information. Authentication methods using PINs, passwords, tokens, and the like may be used. In a conventional thin-client environment, the thin-client user uses whatever authentication method has been established at the host or virtual computer in the data center. In an embodiment, the user's smartphone is integrated into in the authentication process for fit client 140. In an embodiment, an authentication component 344 and a presence-detection component 340 (FIG. 3) provide integration of smartphone authentication mechanisms with fit client 140.

In an embodiment, fit client 140 includes the capability of establishing a link 152 to the user's smartphone 150. The link 152 may be a wireless link such as Bluetooth or Wi-Fi Direct. Establishing this link between a particular smartphone 150 and a particular fit client 140 for the first time may involve performing a one-time "pairing" operation.

Authentication may occur in two directions. The user of the fit client 140 may authenticate the user's identity, and the smartphone 150 may also validate that the fit client 140 is running trustworthy software, to ensure the smartphone can safely share information with the fit client. Thus, in an embodiment, once the link 152 is established between a smartphone 150 and a fit client 140, the authentication component 344 exchanges data with the smartphone 150 establishing proof that the fit client is running trusted software. The data may comprise a digital certificate or digital signature.

The smartphone 150 will treat software running on the fit client 140 as trusted if such software is authenticated by the manufacturer of the fit client 140, or by the IT department or other authority of the user's organization, or by both. Methods of authentication are discussed below. If the fit client 140 is authenticated only by the manufacturer and is not authenticated by the user's organization, then the smartphone 150 many deny access to some information and functionality to the fit client 140. If the fit client 140 is authenticated by the manufacturer and an organization other than the user's organization, then the smartphone 150 may refuse to share any information with the fit client 140. When a smartphone 150 is first deployed for use with a fit client 140, the IT department or other authority of the user's organization configures the identities of the manufacturer and the user's organization into the smartphone 150 so that such authentication checks can be made.

One method of authenticating, or establishing the trustworthiness of, the fit client 140 is by providing a chain-of-trust through the boot process of the fit client 140. The trustworthiness of the initial bootstrap code and the programming details for configurable hardware (such as an FPGA bitstream) can be established using a hash or digital signature of the code or code-flow, that is certified by the manufacturer of the fit-client 140. This signature can be checked against the manufacturer's published certificate, which the smartphone 140 either has in its local certificate store or can fetch over the network 120 from a well-known certificate authority.

Trustworthy bootstrap code running on the fit client 140 can be trusted to authenticate the OS 320. Either the bootstrap code or (once approved) the OS 320 will authenticate the filesystem and executable code stored in the nonvolatile memory 273. Parts of the filesystem and executable code may be authenticated by the manufacturer, that is, have their digital signature certified by the manufacturer's published certificate. Parts of the filesystem and executable code may be authenticated by, that is, have their digital signature certified by the published certificate of, other organizations. The fit client 140 may make available to the smartphone 150 the inputs and results of all authentication checks.

When a smartphone 150 is first deployed for use with a fit client 140, the IT department or other authority of the user's organization may configure the identities of the manufacturer and the user's organization into the smartphone 150 so that authentication checks can be made. The IT department or other authority of the user's organization may also configure the smartphone 150 with other information that may be used during authentication checks, such as certificates and the URIs of one or more certificate authorities.

In various embodiments, smartphone 150 has two paths to the network that the smartphone can use to obtain and check certificates—one through the link 152 to the fit client 140 and then directly to the network 120, and the other through the link 154 to the cellular service provider's network 134 and then to the network 120. A certificate authority (not shown in FIG. 1) is reachable through the network 120, for example, in the data center 100.

The fact that the smartphone 150 has a connection to the network 120 that is independent of the fit client 140 provides additional security in an embodiment. For example, if the fit client 140 has been compromised and is running untrustworthy software, the fit client could provide the smartphone 150 with a "fake" certificate, and then block the phone's attempts to validate the certificate through the link 152. But the fit client 140 has no way to block the phone's validation requests when they are made through the link 154.

Once the smartphone 150 is satisfied that the fit client 140 is running trustworthy software, the smartphone may present the user's credentials, stored in the smartphone 150, to the authentication component 344 for logging into the fit client 140 and for any subsequent login to the applications to which the fit client provides access (e.g. a virtual computer or applications running in the data center 100). Authentication component 344 may in turn provide some or all of these credentials to applications for authentication, as needed. For example, authentication component 344 may provide the credentials to applications by saving a keyring file locally to the fit client, which file may then be utilized by a keyring application or the application component to respond to a request for authentication.

As set by policy, login may be allowed using only the credentials stored in the smartphone 150. For example, anyone can log in who is in possession of the smartphone 150. Alternatively, authentication component 344 may require the user to provide additional credentials, such as a password or PIN typed on the fit client's keyboard.

In an embodiment, since fit client 140 is stateless, the authentication component 344 communicates over the network 120 with a login server 109 running in the data center 100 to validate the user's credentials stored on the smartphone 150 as well as any additional password or PIN supplied by the user. As with the access server 108, the location of the login server 109 may be determined using prior-art methods. Also, in some embodiments, the location of the login server 109 may be part of the access information that is provided by the smartphone 150 or the access server 108. In some embodiments, the access server 108 and the login server 109 may be the same server.

Figure 9:
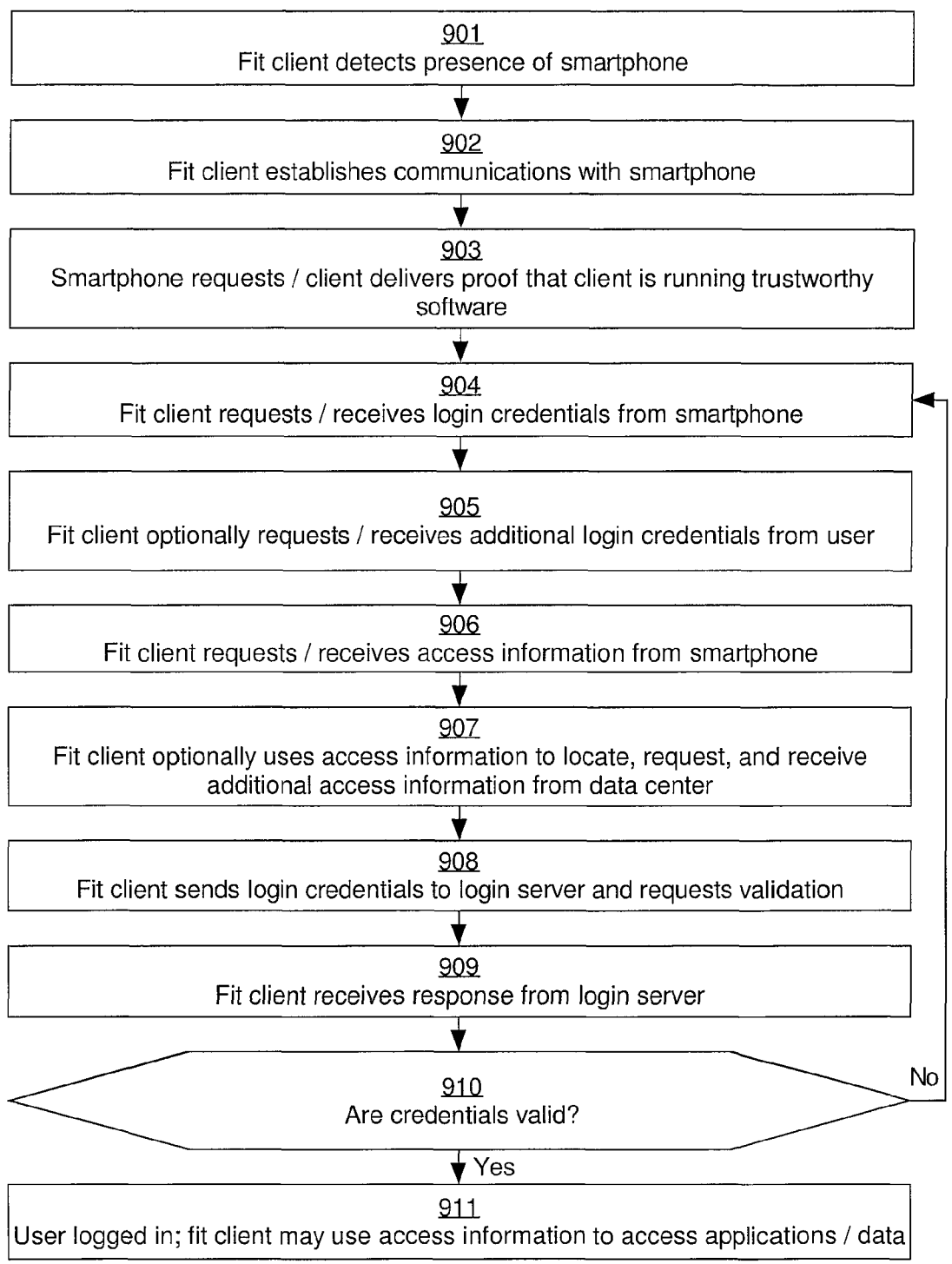
FIG. 9 is a flowchart of a series of steps that are taken among a fit-client device, a smartphone, and a user to begin a session in an embodiment.

FIG. 9 summarizes the series of steps that are taken among the fit client 140 (running presence-detection component 340 and authentication component 344), the smartphone 150, and the user to begin a session. In step 901, the fit client 140 detects the presence of the user's smartphone 150, and in step 902 the fit client 140 establishes communication with the smartphone 150 using the link 152. In step 903, the smartphone 150 requests and the fit client 140 sends proof that it is running trustworthy software.

In step 904, the fit client 140 requests the user's login credentials from the smartphone 150, and the smartphone 150 sends them to the fit client 140. In step 905, the fit client 140 optionally requests and receives additional login credentials directly from the user, using its own input/output interfaces such as display 202 and keyboard 404.

In step 906, the fit client 140 requests access information from the smartphone 150, and the smartphone 150 sends access information to the fit client 140. In step 907 (optional), the fit client 140 uses received access information to locate, request, and receive additional access information from the data center 100. Steps 906 and 907 may occur prior to or in parallel with steps 904 and 905.

The access information received in step 906 or 907 may include the location of a login server 109, or the location may already be known to the fit client 140. In step 908, the fit client 140 sends the login credentials received in steps 904 and 905 to the login server 109, and requests validation of the credentials. Unless the location of the login server 109 is provided as part of the access information, step 908 may occur prior to or in parallel with steps 906 and 907.

In step 909, the fit client 140 receives the validation result from the login server 109.

In step 910, if the received credentials are invalid, the fit client 140 may return to step 904 or 905 for a retry, or the fit client 140 may take any reasonable action as known in the prior art for such a case, such as ceasing communication with the smartphone 150 or informing a security server of a possible break-in attempt. If the credentials are valid and the access information has been received, then the fit client 140 continues to step 911, sets the user's status as "logged in," and allows the user to run local applications and to access remote applications and data using the access information.

In embodiments where the smartphone 150 does not provide any credentials to the fit client 140, such as where the smartphone 150 sends only a unique identifier to fit client 140, the fit client 140 may obtain login credentials directly from the user via keyboard 204 and/or other input devices. Fit client 140 then communicates with the login server 109 to validate the credentials. Once the credentials have been validated and the user is "logged in," the access server 108 may send access information to the fit client 140 using as described previously. In some embodiments, the access server 108 and the login server 109 may be the same server.

Figure 10:
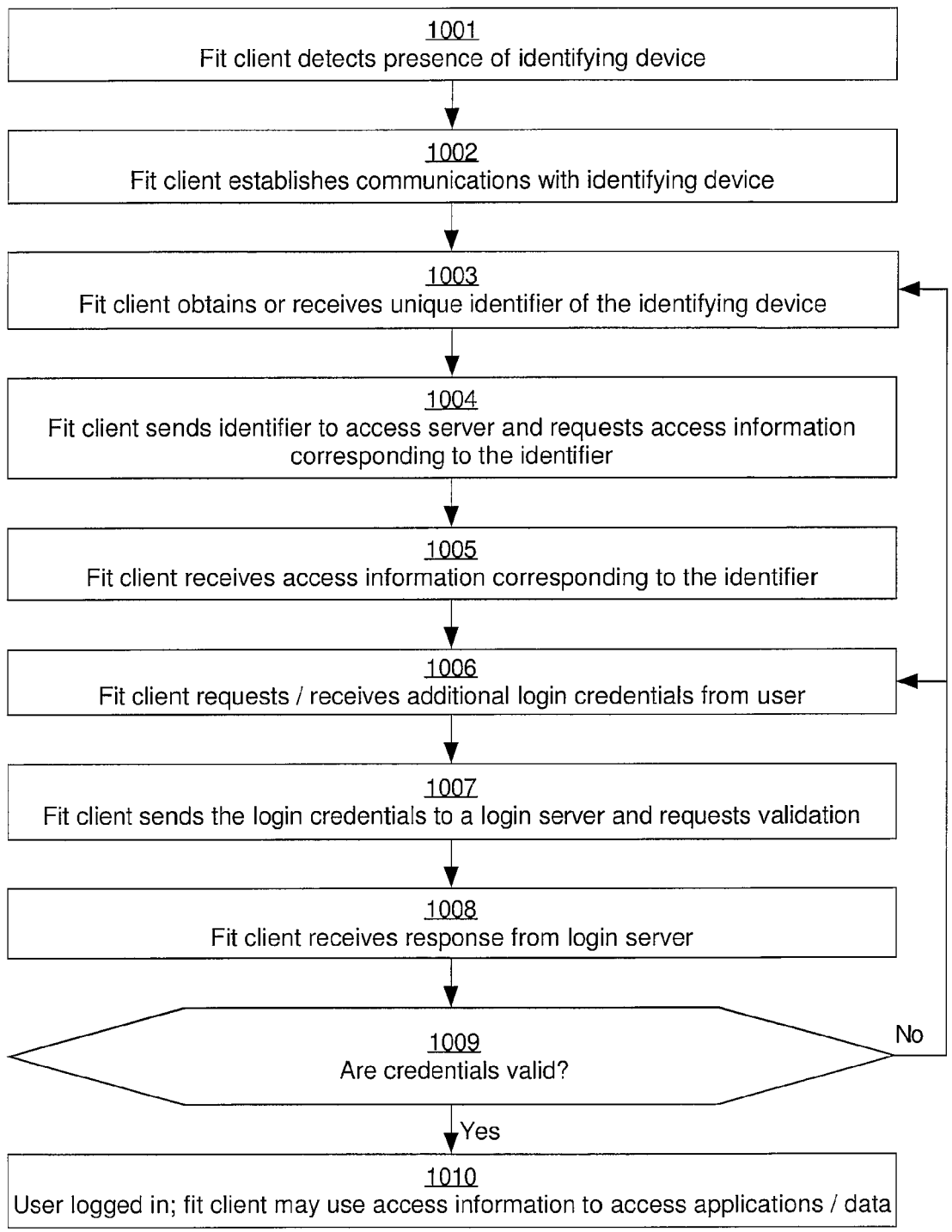
FIG. 10 is a flowchart of a series of steps that are taken among a fit-client device, an identifying device, and a user to begin a session in an alternative embodiment.

FIG. 10 summarizes the series of steps that are taken among the fit client 140 (running presence-detection component 340 and authentication component 344), the identifying device 150, and the user to begin a session. In step 1001, the fit client 140 detects the presence of the identifying device 150, and in step 1002 the fit client 140 establishes communication with the identifying device 150 using the link 152.

In step 1003, the fit client 140 obtains the unique identifier of the identifying device. For identifying devices that use conventional Bluetooth or Wi-Fi wireless communication and where the identifier is the device's Bluetooth or MAC address, obtaining the identifier is inherent in establish communication (step 1002), since the Bluetooth or MAC address is included in each message transmitted by the device across the link 152. For other devices, or when a different unique identifier is used, the fit client 140 may explicitly request the unique identifier from the identifying device 150 and wait for a response.

In step 1004, the fit client 140 sends the unique identifier to an access server 109 and requests access information corresponding to the identifier, and in step 1005 the fit client 140 receives the requested access information. The access information received in step 1005 may include the location of a login server 109, or the location may already be known to the fit client 140.

In step 1006, the fit client 140 requests and receives login credentials from the user, using input/output interfaces such as display 202 and keyboard 404. In step 1007, the fit client 140 sends the login credentials received in step 1006 to the login server 109, and requests validation of the credentials. Unless the location of the login server 109 is provided as part of the access information, steps 1006 and 1007 may occur prior to or in parallel with steps 1001 through 1005.

In step 1008, the fit client 140 receives the validation result from the login server 109.

In step 1009, if the received credentials are invalid, the fit client 140 may return to step 1003 or 1006 for a retry, or the fit client 140 may take any reasonable action as known in the prior art for such a case, such as ceasing communication with the identifying device 150 or with the user, or informing a security server of a possible break-in attempt. If the credentials are valid and the access information has been received, then the fit client 140 continues to step 1010, sets the user's status as "logged in," and allows the user to run local applications and to access remote applications and data using the access information.

In an embodiment, no credentials are necessary, and a user is assumed to be authenticated simply by being in possession of smartphone or identifying device 150.

In an embodiment, when a user is logged in, the presence-detection component 340 in the fit client 140 may continue to monitor the user's presence by monitoring the link 154. If the link becomes disconnected, then the user may be assumed to be no longer present. For wireless links 154 such as Bluetooth or Wi-Fi Direct, it is also possible to monitor the link's signal strength, receive a signal strength value, and infer the user's proximity, presence or absence based on a magnitude of the signal strength value. The presence-detection component 340 may use other means for presence detection, and at times it may use different means to determine presence or non-presence than it used when initially establishing a user's session, including the following in various embodiments:

1) Detection of an RFID attached to a user's smartphone 150, employee badge, or other object normally carried by the user, using an RFID detector coupled to the fit-client hardware.

2) Monitoring of the user's location via GPS or other location-detecting system on the smartphone 150, communicating this information via the link 154, and declaring the user to be "not present" when the distance from the user's location at the time of login is over a certain threshold. In an embodiment, the location of the fit client 140 is received, and can be inferred to be the same as that of the smartphone 150 at the time of login.

3) Monitoring the fit client's video camera 210, and declaring the user to be not present when no motion is detected for a certain period of time, or when no face is detected. In this method, the user cannot be assumed to be back when motion or a face is detected again, since someone else could be causing it, unless a face-detection mechanism that can reliably identify the particular user's face is being used.

4) Monitoring the user's input activity, such as keystrokes, mouse movement, and button presses, and declaring the user to be "present" when activity is detected and "not present" when a certain amount of time has elapsed since the most recent activity.

In an embodiment, when the user is determined to be no longer present, in response, the presence-detection component 340 in conjunction with the OS 320 locks the fit client 140 so that the user's applications and data cannot be viewed or modified; for example, a screensaver is displayed on the display 202. However, as set by policy, it may be possible for anyone to still access some or all voice and video communication functions, such as placing and receiving calls.

In an embodiment, if the user returns and is present within a certain time set by policy, the presence-detection component 340 unlocks the fit client 140, returning its display and other state to what it was before the user left. Besides user presence, unlocking may require the user to provide additional authentication, such as a PIN or password, as set by policy.

In an embodiment, if the user becomes not present, and after a certain time set by policy, the presence-detection component 340 in conjunction with the OS 320 renders unreadable any of the user's permanent information or state that has been cached locally, such as user credentials and document files that were being viewed locally. In an embodiment, rendering data unreadable does not erase the original documents stored at the data center 100, nor does it necessarily erase state data at the data center 100 describing the state of applications running on the fit client 140, or state data at the fit client 140 describing the state of which applications the fit client is running or the like. In an embodiment, if the user should return, any information from the data center 100 or the smartphone 150 that was previously cached on the fit client 140 may be copied to the fit client again, depending on the method that was used to render it unreadable.

In an embodiment, if the user is not present for a certain time set by policy, generally longer than the time required for the fit client 140 to lock itself, the fit client 140 will "log out" the user.

In an embodiment, a user can log in to the fit client 140 when the smartphone 150 is not present. Besides the user's regular password or PIN, this may require the user to provide additional credentials (e.g., answering questions whose answers only the user is likely to know) that are not required when the smartphone 150 is present.

Besides automatic, timeout-induced logouts, in an embodiment, a logout can be requested explicitly by any user. The actions that occur during a logout vary by application and location (running in the data center 100 or on the fit client 140) and as set by policy.

In some embodiments, local applications such as document viewing may terminate at logout. In other embodiments, local applications such as document viewing may send some or all of the application's current state (such as window size and location, document zoom and location being viewed, etc.) to the data center 100, so that the application can be restarted and its state restored the next time the user logs in to a fit client 140 (which could be a different physical instance of the fit client 140).

In some embodiments, applications running in the data center 100 during a fit-client logout may terminate, and take whatever actions they would take if they were running on a user's desktop or mobile computer when the user logged out. For example, a word-processing program may save a current copy of the document being edited, and an email program may attempt to send unsent messages. In other embodiments, the user's logout from the fit client 140 would not terminate any applications running in the data center 100. Instead, the application would continue to run, but not receive any user inputs or generate any outputs. At some future time, when the user again logs into the same or a different fit client 140, the application's inputs and outputs are "reconnected" to the user's fit client 140. After a refresh of the user's display and other state on the fit client 140, whether web-based or using a VNC- or RDP-like protocol, the application and the user continue operation from the previous state.

In an embodiment, when a logout occurs, whether automatic or explicitly requested by the user, the presence-detection component 340 in conjunction with the OS 320 renders unreadable any of the user's permanent information or state that has been cached locally, as in the user-not-present case described previously. The fit client 140 is thus "stateless," since the fit client stores no user information between user sessions. This may be particularly useful in mobile embodiments of the fit client 140, which may be more susceptible to physical loss or theft than desktop embodiments.

10.0. Data Security

In an embodiment, fit client 140 caches certain data from the data center 100 in part to achieve crisp and smooth performance and a good user experience. For example, when a document-viewing application runs locally on the fit client 140, all or at least a portion of the document file being viewed may be stored temporarily on the fit client. Also, in an embodiment the fit client 140 also obtains and temporarily stores other information from the user's smartphone 150 or from the data center 100, such as access information, passwords and other credentials, communication logs, and contact databases.

Many users may be concerned about the security of their documents, files, and other sensitive information when stored, even temporarily, on the fit client 140. This information can be "snooped" when the information is in transit between the data center 100 or smartphone 150 and the fit client 140. Therefore, in certain embodiments, the link 152 between the fit client 140 and the smartphone 150 is secured, so that all data transmitted thereon is encrypted. Symmetric or asymmetric encryption techniques may be used. In alternative embodiments, the link 152 may be insecure, but particular transactions on the link may be secured using protocols such as SFTP as required. In an embodiment, fit client 140 uses encryption/decryption units 260 to perform the encryption and decryption operations. As set by policy, in various embodiments data transmitted on the network 120 between the fit client 140 and the data center 100 may or may not be encrypted, depending on the type of data and corresponding applications and the encryption services offered by the data center 100.

In an embodiment, when user information has been decrypted and stored on the fit client, the user information is also subject to security risks. For example, where the temporary file storage is provided by a flash chip or module 273, an attacker could remove power from the fit client 140, remove the flash chip or module 273 from the system, and then read and copy the flash chip or module 273 in a different device.

In an embodiment, to ensure the security of user information, the fit client 140 encrypts all temporary files and other sensitive user information using an encryption unit 260 before storing the files or other information in flash memory 273 or, optionally, DRAM 271. The key used for such encryption may be generated by a security-key-generation unit 262 and may be stored in a private area of the SoC 230. The same key is used by a decryption unit 260 to decrypt the user information when the user information is read and used by the SoC 230. Thus, the cleartext data is not readable in the memory or when the cleartext data is stored or read using the external bus that connects the memories 273, 271 to the SoC 230.

In an embodiment, additional measures may be taken for environments requiring more security. For example, in the above method, portions of cleartext data may be present in DRAM 271 buffers used by encryption and decryption utilities as well as by application programs in their normal operation, and can be seen or probed by conventional equipment and methods especially as the data is written to or read from DRAM 271 on an external bus. This vulnerability can be mitigated by using encryption to protect all of the DRAM 271, or by using an SoC 230 that has sufficient on-chip DRAM or other working memory to allocate all buffers there, so the cleartext data never appears on the external pins of the SoC 230. Yet another approach is to use physical, epoxy "potting" so that the external pins cannot be probed.

In an embodiment, the encryption key is generated inside the SoC 230, and the fit-client is configured so that a copy of the key is never moved off-chip and never appears on the external pins of the SoC 230. However, sophisticated and physically invasive techniques can be used to probe the internals of the SoC 230 while the SoC is operating. To guard against this possibility, in an embodiment physical measures including "booby traps" can be provided to render the SoC 230 inoperable if such probes are attempted.

In an embodiment, fit client 140 hosts trusted operating software. In an embodiment, any of several methods can be used to ensure that only the trusted operating software can be run on the fit client 140. For example, ARM TrustZone Technology from ARM Ltd. is a combination of hardware and software to provide trusted software operation in ARM-based SoCs.

In an embodiment, the fit client 140 renders the user's cached files and other information stored in the fit client unreadable under certain circumstances, using logic configured to clear or erase the portions of the flash memory 273 or DRAM 271 that store such information.

In an embodiment, the user's cached files and other information can be rendered permanently unreadable by clearing or erasing the copy or copies of the security key that was used to encrypt the files or other information.

In an embodiment, cached information can be rendered unreadable but restorable under controlled conditions if all copies except for one copy of the encrypting security key are erased, and the remaining copy is saved in such a way that an attacker cannot gain access to the remaining copy. In an embodiment, the remaining copy of the key is stored in volatile memory in the SoC 230, such as scratchpad RAM 276. In this way, a determined attacker could not see the key even by monitoring the external pins of the SoC 230. In an embodiment, the fit client 140 is configured so that an attacker cannot read the key from the scratchpad RAM 276 or other memory using a debugging or other program that allows probing of memory locations, and fit client 140 is configured to ensure that the fit client is running trusted software.

In an embodiment, a security method executes in cooperation with the user's smartphone 150. In an embodiment, after generating the encryption key, the fit client 140 sends the key to the smartphone 150 using the link 152, and destroys its own copy of the key. In an embodiment, to prevent snooping, the link 152 is secure or the transaction that sends the key from the fit client 140 to the smartphone 150 uses a secure protocol. The fit client 140 then requests the smartphone 150 to send a copy of the key back to the fit client, and tags the received key with a time T which is the time at which the key was received. The fit client 140 also has a timer-based facility that erases its copy of the key when a period of T1 seconds has elapsed after time T. This facility could be software or hardware based. Meanwhile, the smartphone 150 "refreshes" the key stored by the fit client 140 by sending a copy back to the fit client using the link 152 every T2 seconds, where T2 is less than T1. Each time the fit client 140 receives a copy of the key from the smartphone 150, the fit client stores the copy of the key and tags the copy of the key with the time T at which the copy of the key was received. In this way, the fit client 140 erases its copy of the encryption key, and its cached user information will be rendered unreadable, a short time after the smartphone 150 is no longer communicating with the fit client using the link 152.

Figure 8:
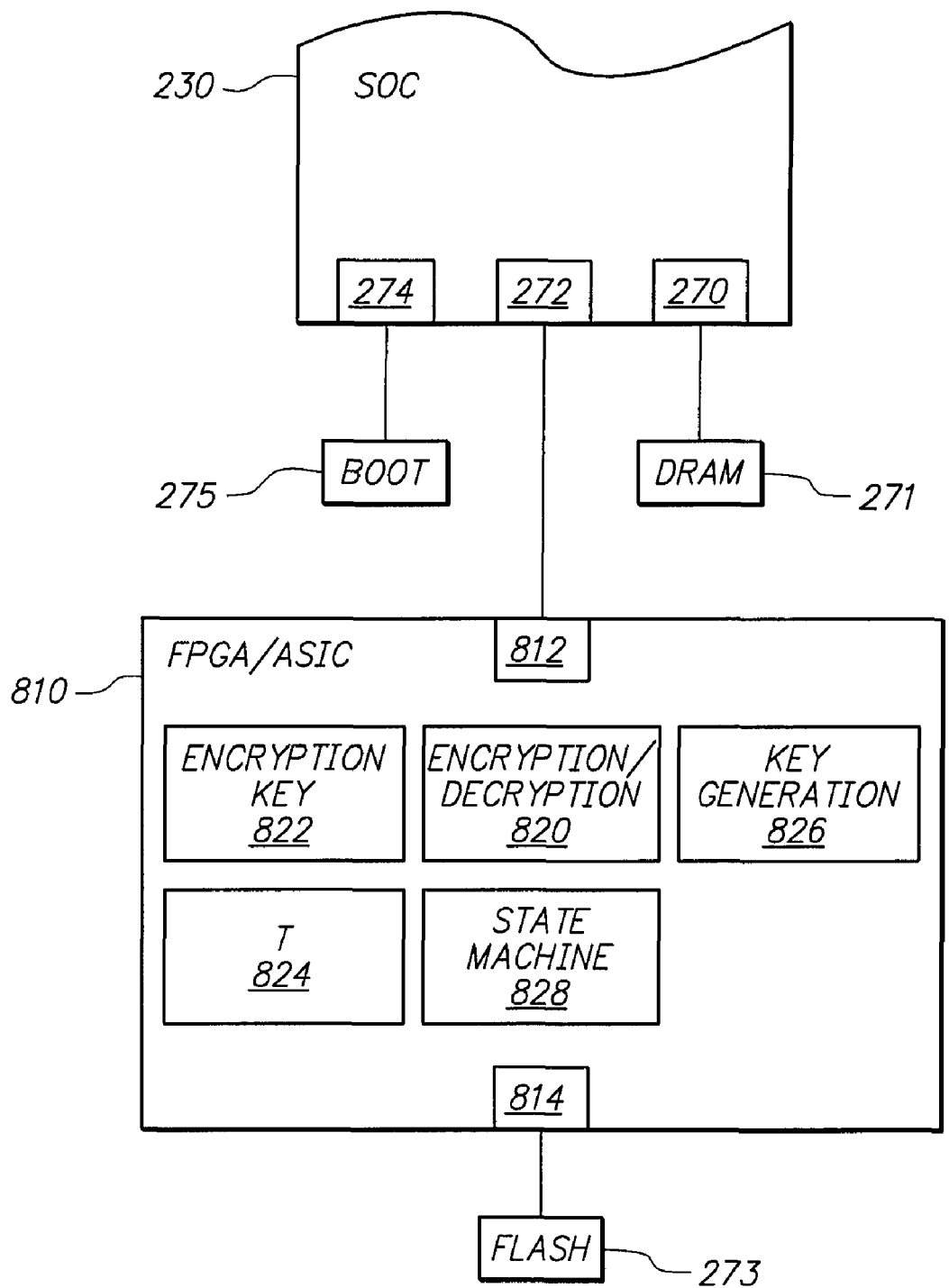
FIG. 8 shows a portion of an embodiment of a fit-client device that provides hardware-based security.

In an alternative embodiment, hardware can be deployed to ensure that security cannot be thwarted by software errors or software attacks. FIG. 8 is a block diagram of a security enhanced embodiment. The nonvolatile memory 273 is connected to a security FPGA or ASIC 810 through an interface 814. The security FPGA or ASIC 810 in turn uses an interface 812 to connect to the SoC 230 through the interface 272. The FPGA or ASIC 810 contains an encryption/decryption engine 820 which is used to encrypt data going from the SoC 230 to the nonvolatile memory 273, and to decrypt data in the reverse direction. The FPGA or ASIC 810 also contains a register (or memory location) 822 which stores the encryption key that is used to encrypt and decrypt data, and a register (or memory location) 824 which stores the time T at which the register 822 was last loaded. The FPGA or ASIC 810 also may contain the facilities 826 needed to generate a random key, such as a true-random-number generator, for security purposes. In some embodiments, the security FPGA or ASIC 810 may be part of the SoC 230.

In this embodiment, the FPGA or ASIC 810 is the root of trust for the fit client 140. A root of trust, also known as a trust anchor, is an authoritative entity represented by a public key and associated data, whereby a relying party can determine if a digitally signed object is valid by verifying a digital signature using the root of trust's public key. For example, the smartphone 150 can verify that the FPGA or ASIC 810 is one that has been manufactured and signed by a particular manufacturer, and is not an unauthorized and possibly compromised copy. The root of trust is the basis for confirming the integrity of higher layers of firmware and software.

The FPGA or ASIC 810 contains a state machine or microcontroller 828 that can be used to establish secure communications between the state machine or microcontroller and the user's smartphone 150. That is, using the state machine or microcontroller 828 and the interfaces 272 and 812, the FPGA or ASIC 810 communicates with the SoC 230 which in turn communicates with the smartphone 150 using the link 152, which could employ, for example, the Bluetooth interface 254 or the Wi-Fi interface 252. When communicating for the first time, the FPGA or ASIC 810 and the smartphone 150 can establish a secure communication channel with each other using a technique such as public-key encryption, so that the SoC 230 never sees the cleartext version of any data exchanged between them. The security key used for data exchange may be generated using key-generation facilities 826 in the FPGA or ASIC 810, or the security key may be generated by such a facility in the user's smartphone 150 and be transmitted over the secure communication channel to the FPGA or ASIC 810.

In either case, the entity that generates the key sends a copy to its partner using the link 152, and the FPGA or ASIC 810 stores the key in the register 822. The register 822 provides the key for encrypting and decrypting data stored in the nonvolatile memory 273. At this point, operation proceeds as described previously, but the operation is controlled by the state machine or microcontroller 828 which, as a hardwired entity, is immune from software attacks. In an embodiment, the smartphone 150 "refreshes" the key stored in the register 822 by sending a copy back to the register 822 using the secure communication channel over link 152 every T2 seconds. Each time the FPGA or ASIC 810 receives a copy of the key from the smartphone 150, the FPGA or ASIC 810 stores the copy of the key in the register 822 and tags the copy of the key by storing in the register 824 the time T at which the copy of the key was received. The FPGA or ASIC 810 has a timer-based facility that erases its copy of the key in the register 822 when a period of T1 seconds has elapsed after time T, where T1 is greater than T2. In this way, the fit client 140 will erase its copy of the encryption key, and its cached user information will be rendered unreadable, a short time after the smartphone 150 is no longer communicating with the fit client using the link 152.

In some embodiments, the file-system component 322 includes the ability to selectively encrypt information as it is stored in files in the nonvolative memory 273. However, such embodiments could be subject to software attacks, in which trusted file-system component 322 is replaced with malicious software that does not use the encryption unit 260 for some or all files. It is also possible that trusted but nevertheless incorrect file-system component 322 could inadvertently omit encryption of certain files if it has the ability to encrypt selectively.

In embodiments that use an FPGA or ASIC 810 with a state machine or microcontroller 828 to establish secure communications between the fit client 140 and the user's smartphone 150, such malicious or inadvertent breaches of security as described above can be avoided. In such embodiments, the state machine or microcontroller 828 autonomously establishes secure communications with the smartphone 150, without relying on possibly malicious or erroneous software in the fit client 140. Such an FPGA or ASIC 810 can be designed to unconditionally encrypt all data that is stored in the nonvolatile memory 273. Since the fit client 140 itself never sees the cleartext key for such data, the stored data is immune to the possible breaches of security described above.

11.0. Data Storage and Synchronization

In an embodiment, the user's information (data) can be stored either in the data center 100 or in the smartphone 150 or both, as is most natural and appropriate for a particular type of information, while still providing universal access to such information. In an embodiment, a password-storage or "keyring" application allows users to store passwords, other credentials, and sensitive information in an encrypted keyring file, and access the unencrypted information by presenting a master password. In an embodiment, a keyring application and its keyring file exist in the user's smartphone 150. When the fit-client user needs to use information in the encrypted keyring file, at least two different modes of operation are possible:

1) The fit client 140 causes the keyring application to run on the user's smartphone 150, locate and decrypt the needed information, and send the information to the fit client 140 in an encrypted format using the link 152. To enable this operation, the user may present the master password directly to the keyring application running on the smartphone 150, or the user may enter the master password on the fit client 140, which then sends the master password in encrypted format using the link 152 to the keyring application running on smartphone 150, which decrypts and uses the master password.

2) After the fit client 140 associates or connects with the user's smartphone 150, the fit client requests a copy of the keyring file to be sent to the fit client using the link 152; since the file is already encrypted, no further encryption is required. This copy of the keyring file is cached by the fit client 140 as long as the user is logged in. When the fit-client user needs to use information in the keyring file, an equivalent of the keyring application running locally on the fit client 140 locates and decrypts the needed information from the cached keyring file.

The user may wish to add to, modify, or delete information stored in the keyring file. In the second mode of operation above, operations to add, modify, or delete information stored in the keyring file are performed locally by the keyring application running on the fit client 140, which sends an updated keyring file back to the user's smartphone 150, which is the long-term storage location for the keyring file.

Certain of the passwords or credentials stored by the keyring application may be for uses that are known to fit-client 140 application component 330. For example, the keyring application may store a password needed by the thin-client component 380 to log into a virtual computer in the data center 100 that is accessed using RDP or a similar protocol. The keyring application may also store URIs and passwords that are needed to log into websites using the browser 360. In such cases, the fit-client application component 330 may obtain the needed passwords from the keyring application.

In an embodiment, the keyring application may store a backup copy of keyring file in the data center 100. In this case, one-way synchronization is provided. When the keyring file is modified by the keyring application on the fit client 140, the modified file is sent to the data center 100 using the connections 102 and 121 through the network 120. When the modification is made on the smartphone 150, the modified file is sent to the data center 100 either using the link 152 to the fit client 140 and then through the network 120, or it is sent using the wireless link 154 to cellular-service provider's network 134 and then using the connection 132 through the network 120. The latter method may be used if the smartphone 150 is not currently connected to the fit client 140 using a link 152.

In some embodiments, the fit client 140 may provide a means of using and updating the keyring file even when the smartphone 150 is not connected to it. In this case, the keyring file stored in the data center 100 is more than a backup; the keyring file is a second, active version. In a third method, fit client 140 reads the file from the data center through the network 120 and caches a copy locally. The fit client uses information from the cached keyring file in the same way as when it obtains the cached copy from the smartphone 150. In the case of modifications to the keyring file, the fit client sends the modified keyring file back to the data center 100 through the network 120; since the file is already encrypted, no further encryption is required. The fit client 140 monitors future connections between itself and a smartphone 150. When a phone is connected, the fit client 140 checks the versions of the keyring file stored in the data center 100 and in the smartphone 150, and it may copy the newer file to the location of the older file.

In some embodiments, application software in the fit client 140 may perform a more detailed consistency check of the data in the two versions of the keyring file, and present the user with options for resolving inconsistencies. In some embodiments, the keyring application may not run directly on the fit client 140; rather the keyring application runs in the data center 100 and is accessed by the user in a web-browser window or using a remote display protocol such as Microsoft's RDP on the fit client 140, as previously described for other applications that run in the data center 100.

In other embodiments, the smartphone 150 may, independently of a connection to a fit client 140, periodically check the data center 100 for a version of the keyring file that is different from what it has stored locally. Upon finding a different version, the smartphone 150 may automatically cause the newer file to be copied to the location of the older file. Application software in the smartphone 150 may perform a more detailed consistency check of the data in the two versions of the keyring file, and present the user with options for resolving inconsistencies.

In an embodiment, an application that uses and stores information specific to a particular user is the contact-list or phonebook utility. Such an application maintains information in a contact file, such as names, addresses, phone numbers, email addresses, instant-messaging handles, website addresses, call histories, and the like for people and companies with whom user communicates. In an embodiment, a contact-list utility may run on the smartphone 150, in the fit client 140, or in the data center 100. In an embodiment, the contact-list utility runs in the fit client 140, and integrates with the communications capabilities of the fit client. For example, a user can initiate a voice or video phone call to a contact directly from the contact-list utility by selecting an icon next to the contact name or by selecting the contact name. Conversely, a user can add an item to the contact list using information in an incoming phone call or in a web page or document being viewed. Running the contact-list utility on the fit client 140 rather than in the smartphone 150 or the data center 100 makes it easier to integrate this functionality with the voice and video telephony component 370 and other components of the fit client 140.

In an embodiment, data storage and synchronization methods and operations for the contact-list utility may be used as described for the keyring application. In an embodiment, since the contact file may not be encrypted when stored, as set by policy the contact file may be encrypted for security when transferred among the data center 100, the fit client 150, and the smartphone 150. In certain embodiments, the contact file is always stored and transferred in an encrypted format.

In an embodiment, an access information file stored in the smartphone 150 includes URNs, URLs, server names, file names, user credentials, values indicating methods (e.g., browser vs. RDP), and other information that the fit client 140 may use to access commonly used applications that run in the data center 100. The data storage and synchronization methods for the access information file are similar to those for the keyring application. In an embodiment, the access information file is managed and updated by an entity other than the user, such as the user's IT department, for example, when the user is an employee of an organization. This approach allows the IT department to manage the set of non-local applications that are easily accessed by the user, which could be different for different sets of users.

In an embodiment, an application that uses and stores information specific to a particular user is the web browser. User-specific information includes bookmarks, browsing history, cookies, and forms entries. A typical user in the fit-client environment may prefer to have the same bookmarks, browsing history, and forms entries to be used in both the smartphone 150's browser and in the browser 360 running on the fit client. Thus, for at least the bookmarks, browsing history, and forms entries items, data storage and synchronization methods may be used that are similar to those for the keyring application. In an embodiment, the cookies associated with some websites may be inappropriate when moved from the smartphone 150 to the fit client 140 or vice versa, for example, if they make assumptions about screen size. Thus, fit client 140 and its browser 360 may provide the option to disable cookie synchronization for selected web sites. The URLs of the selected web sites can be stored in a "no-sync" file that is maintained in the fit client 140 when the user is connected, and stored on the smartphone 150 and/or in the data center 100 when the user is not logged in.

There may be other cases where the user would prefer not to synchronize user-specific application information from his or her smartphone 150 with the data center 100. For example, the smartphone 150 may be used for personal activities as well as business activities. In this case, the user may prefer to keep personal browsing activities private, so that the bookmarks, history, and forms entries for selected web sites are not synchronized with the data center 100. The URLs of such web sites can also be stored in a "no-sync" file. In an embodiment, the "no-sync" file, if stored in the data center 100 as well as in the smartphone 150, is encrypted with a user-private key so that the user's privacy is maintained.

In an embodiment, other applications that use and store information specific to a particular user are the appointment calendar and email. In an embodiment, appointment calendar and email applications run in the data center 100, and the user of a fit client 140 can access them in a web-browser window or using a remote display protocol such as Microsoft's RDP on the fit client 140, as previously described for other applications that run in the data-center 100.

In an embodiment, when the user creates or modifies a document using the fit client 140, the user uses a web-based application in the browser 360, or a data-center-based application using the thin-client component 380, to modify the original document which is stored in the data center. If the document is subsequently transferred to the smartphone 150, and if an application there is used to modify the document, then any of several synchronization methods can be used to synchronize the versions in the data center 100 and on the smartphone 150; there is no independent version stored on the fit client 140. In embodiments where the fit client 140 has a local application that can modify a locally cached copy of the document, then the locally cached copy is eventually sent back to the data center.

Any of several synchronization methods can be used to ensure the synchronization and consistency of the data-center 100 and fit-client 140 versions of a document. The synchronization methods used may be existing methods specific to a data type or application domain. For example, the Microsoft Exchange synchronization protocol may be used for email and calendar information, and the EasySync protocol may be used for Lotus Notes databases, including email and calendar information. The synchronization methods may be generic for arbitrary data types. For example, the Coda distributed filesystem project at Carnegie Mellon University provides methods for synchronizing files after disconnected operation.

12.0. Telephony Features

In an embodiment, the fit client 140 has hardware and software elements that support a full range of voice and video telephony features. In an embodiment, hardware and software elements of fit client 140 may support new features that are not present in a standard desktop VoIP phone or in a PC running VoIP:

1) In an embodiment, the fit client 140 can make calls using the contact information that it copies from the user's smartphone 150.

2) Using its Bluetooth or Wi-Fi Direct connection 224 or 222, in an embodiment the fit client 140 communicates digital audio and telephony signaling information between the fit client and the user's smartphone 150, and can thus act as a high-quality audio device for calls that were placed or received on the user's smartphone 150. The fit client can act as an audio device using its handset 212, using its speakerphone-quality speaker 214 and microphone 216, or using a headset connected to its headset jack 218. A CPU 232 or DSP 236 may be used as appropriate to enhance the audio quality for this feature, especially for speakerphone operation.

In an embodiment, fit client 140 does not support telephony features.

13.0. Example Desktop Terminal Embodiment

Figure 4:
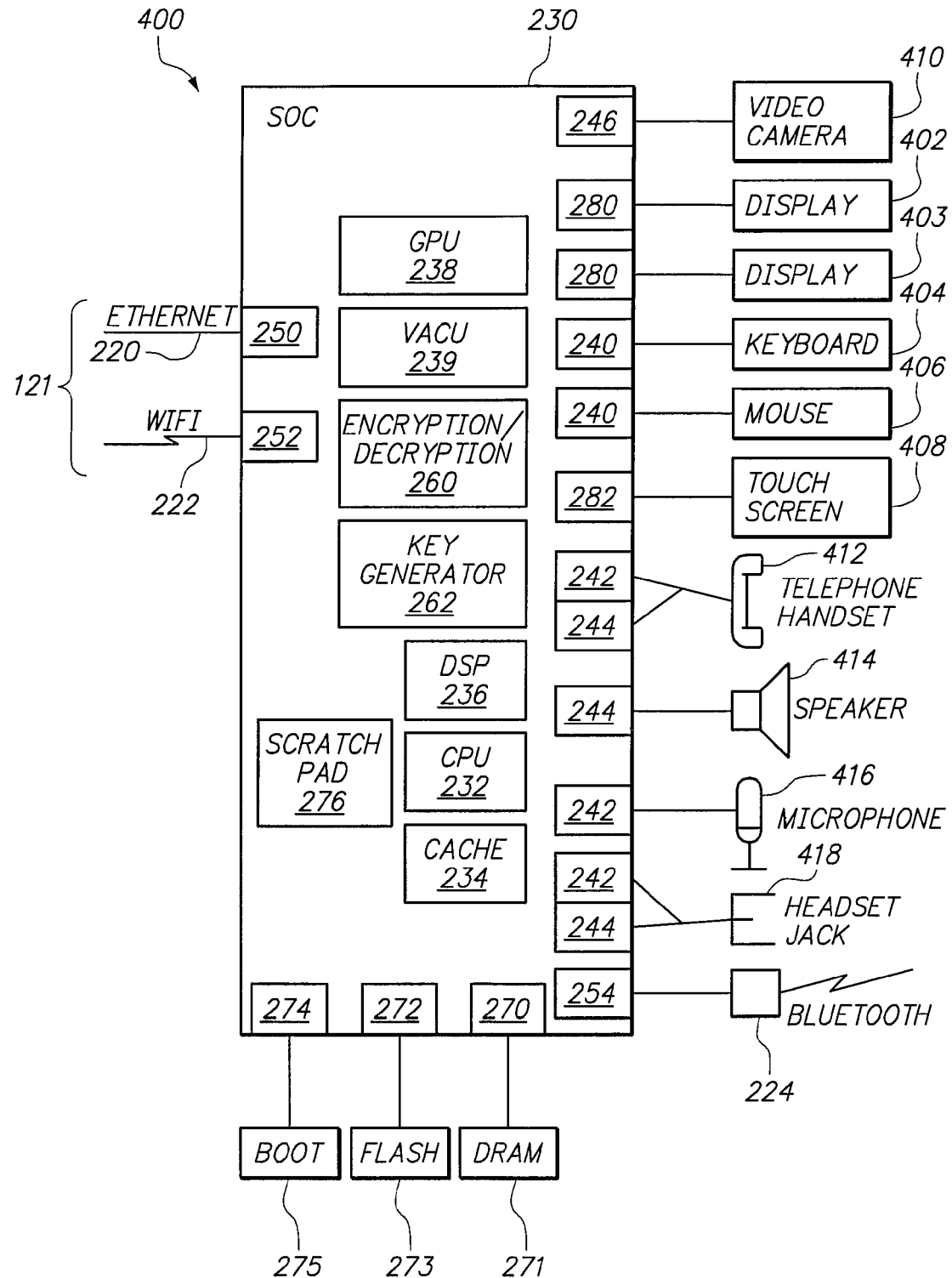
FIG. 4 shows an embodiment of a fit-client device intended for use on an enterprise desktop.

FIG. 4 is a block diagram of an embodiment of the fit-client device intended for use on an enterprise desktop. In an embodiment, Desktop Terminal Device (DTD) 400 may serve as the only device on the desk of someone who does not need a standalone workstation or personal computer. The DTD 400 works in conjunction with a smartphone 150 and the data center 100 to provide computation and communication.

In an embodiment, DTD 400 is a desktop device coupled to a large display 402. In some embodiments, the display 402 is integrated in the same housing with the other electronic components of the DTD 400. In other embodiments, the DTD 400 includes a video connector, such as VGA or HDMI, which may be used to connect a third-party external display 402 with a cable. In some embodiments, the DTD 400 may support a second display 403, which may be either integrated with the main housing or provided externally and connected to the DTD via a connector and cable. In some embodiments, the displays 402 and/or 403 may support touch-screen capability for the user to provide input to the DTD 400.

The DTD 400 supports an external keyboard 404, which is connected to the DTD 400 via a conventional USB interface in an embodiment. In an embodiment, DTD 400 supports a mouse or other pointing device 406, which connects to the DTD 400 using a conventional USB interface. In alternative embodiments, either or both of the keyboard 404 and the mouse 406 could be connected to the DTD 400 using a wireless (e.g., Bluetooth or Wi-Fi Direct) interface. The DTD 400 also supports a video camera (webcam) 410, telephone handset 412, speakerphone-class speaker 414 and microphone 416, and telephone headset jack 418. Each of the video camera 410, telephone handset 412, speakerphone-class speaker 414 and microphone 416, and telephone headset jack 418 may be integrated into the DTD 400 housing, or they may be part of one or more separate housings or mechanical bases connected to the main DTD 400 housing, depending on industrial-design and ergonomic requirements.

In an embodiment, DTD 400 contains a microprocessor system-on-a-chip (SoC) 230 including various functional units and interfaces, and several types of memory, as discussed previously for a generic fit client 140 in connection with FIG. 2.

In an embodiment, DTD 400 has a wired Ethernet connection 220 and/or a wireless Ethernet (Wi-Fi) connection 222 to provide network connectivity 121 as shown previously and discussed in connection with FIGS. 1 and 2. In an embodiment, DTD 400 has a link 152 for connecting to a smartphone 150, as discussed previously in connection with FIG. 1. In an embodiment, link 152 is wireless and may employ the Bluetooth protocol using a Bluetooth interface 254, or the link may employ Wi-Fi or Wi-Fi Direct protocols using a Wi-Fi interface 252.

In an embodiment, DTD 400 supports both computation and communication (telephony) functions and multiple techniques for a user to invoke and control telephony functions such as placing, receiving, and transferring calls. In an embodiment, DTD 400 supports conventional "softphone" operation, in which a representation of a telephony keypad is presented to the user on a display 402 or 403, and the user can "press" the keys using the keyboard 404 and mouse 406. In some embodiments, the displays 402 or 403 may be a touch screen, in which case the keys in the displayed representation of a telephony keypad can be operated by touching the screen, including multi-touch gestures where supported.

In some embodiments, the DTD 400 also includes a separate telephony keypad/display or touch screen 408 which can be used to invoke and see the status of telephony functions. In some embodiments, the telephony keypad/display or touch screen 408 may have no mechanical keys, just a touch screen. In other embodiments, the touch screen 408 may have a number of mechanical keys, while in other embodiments the telephony keypad/display 408 may have a non-touch display and only mechanical keys. The separate telephony keypad/display or touch screen 408 may be integrated with the main DTD 400 housing, or the separate telephony keypad/display or touch screen 408 may be connected via a cable for convenient, optimal ergonomic placement on the user's desk. The separate telephony keypad/display or touch screen 408 may also incorporate the resting place or cradle for the DTD 400's telephone handset 412, and means for detecting whether the handset is "on hook" or not.

In embodiments that include the separate telephony keypad/display or touch screen 408, the DTD 400 can, as set by policy, be used as a conventional, familiar telephone at any time, even when no user is logged in or when the DTD 400 has been "locked" because the user has been determined to be not present. This approach offers some benefits over prior-art "softphone" applications on PCs, where a user must be logged in for telephony functions to be accessible. The DTD 400 thereby replaces a conventional desktop phone (and computer), since phones are expected to be "always usable" for emergencies and the like.

In many environments, the network connection 121 between the DTD 400 and the network 120 will be wired Ethernet, and in particular powered Ethernet. The IEEE 802.3af Power over Ethernet (PoE) standard can deliver almost 13 watts of power to a device such as a DTD 400, and the IEEE 802.3 at PoE standard delivers up to 25 watts to a device. In an embodiment, DTD 400, including an integrated display 402, is powered using PoE. The fit-client architecture, including its use of low-power, high-performance SoCs, allows minimization of the DTD 400's power consumption so that PoE operation can be achieved. In an embodiment, if PoE is not available, or a particular embodiment does not achieve low enough power consumption to use PoE, the DTD 400 can be powered by a conventional power supply.

14.0. Example Desktop Communicator Embodiment

Figure 5:
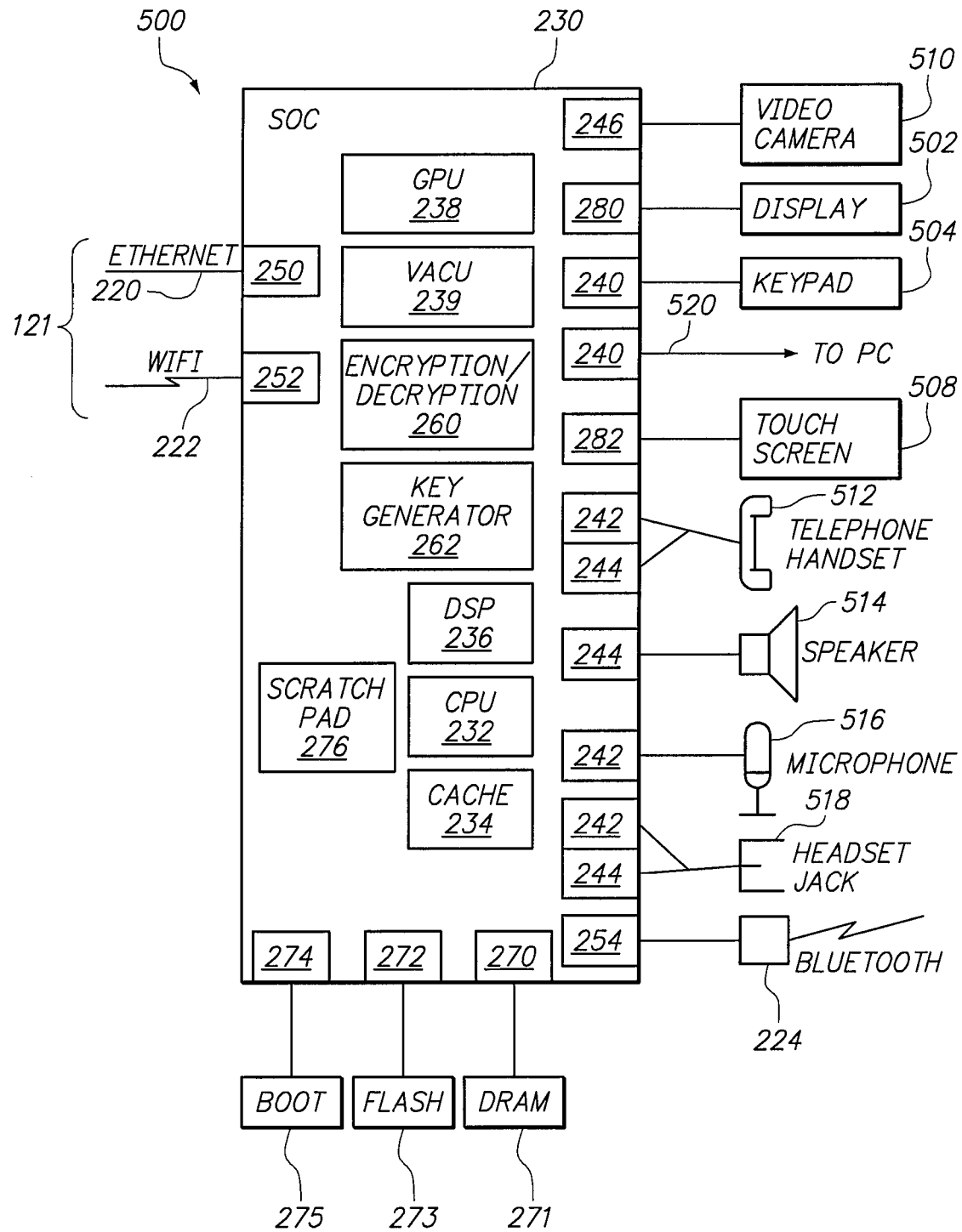
FIG. 5 shows an embodiment of a fit-client device intended for use in combination with a conventional PC on an enterprise desktop.
Figure 6A:
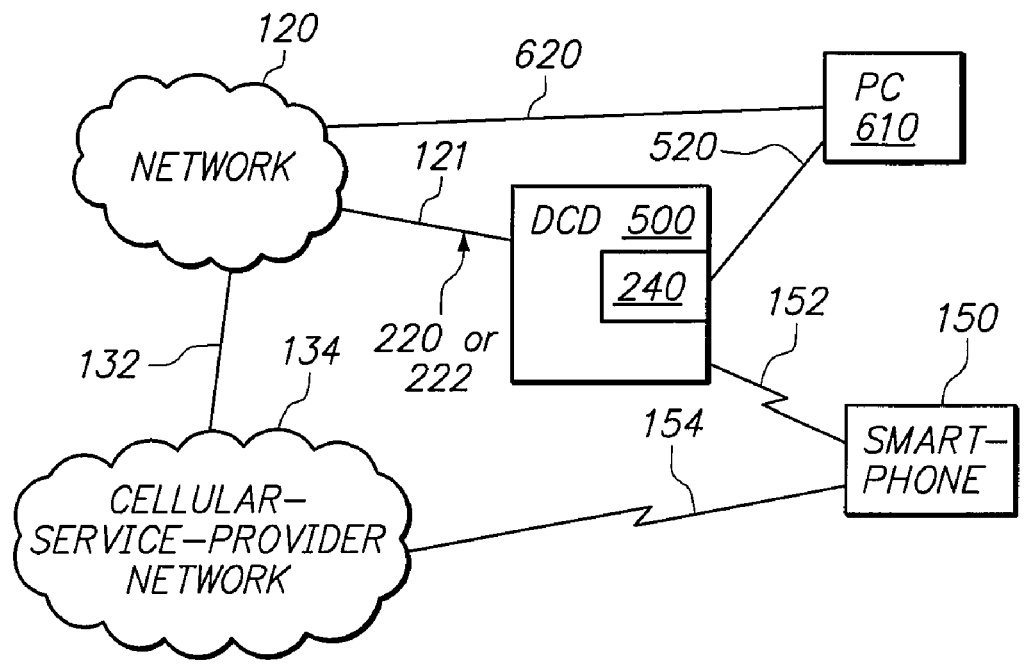
FIG. 6a shows the connection of a fit-client device embodiment to the network and to a conventional PC on an enterprise desktop.

FIG. 5 is a block diagram of an embodiment of the fit-client device intended for use in combination with a conventional PC on an enterprise desktop. In an embodiment, Desktop Communicator Device (DCD) 500 provides integrated communication and application access between a smartphone 150 and an existing desktop PC 610 as shown in FIG. 6a, when it is not desirable to remove the PC 610 from the desktop.

In an embodiment, DCD 500 is a desktop device with a relatively small (e.g., 10 inch) integrated display 502. In some embodiments, the display 502 may support touch-screen capability for the user to provide input to the DCD 500. In other embodiments, the DCD 500 may support a keypad 504 for the user to provide input. In an embodiment, DCD 500 also supports a video camera (webcam) 510, telephone handset 512, speakerphone-class speaker 514 and microphone 516, and telephone headset jack 518. Each of the keypad 504, video camera 510, telephone handset 512, speakerphone-class speaker 514 and microphone 516, and telephone headset jack 518 may be integrated into the DCD 500 housing, or they may be part of one or more separate housings or mechanical bases connected to the main DCD 500 housing, depending on industrial-design and ergonomic requirements.

In an embodiment, DCD 500 contains a microprocessor system-on-a-chip (SoC) 230 including various functional units and interfaces, and several types of memory, as discussed previously for fit client 140 in connection with FIG. 2.

In an embodiment, DCD 500 has a wired Ethernet connection 220 and/or a wireless Ethernet (Wi-Fi) connection 222 to provide network connectivity 121 as shown previously and discussed in connection with FIGS. 1 and 2. As shown in FIG. 6a for an embodiment, the wired Ethernet connection 220 or Wi-Fi connection 222 is separate from the PC's wired Ethernet connection 620. In an alternative embodiment, shown in FIG. 6b, the DCD 500 contains a three-port Ethernet switch 603 to support a wired or wireless Ethernet connection 630 providing the connection 121 to the network 120, a wired Ethernet connection 620 to the PC 610, and a wired Ethernet connection 220 to the DCD's SoC 230. In some embodiments, the three-port Ethernet switch 603 may be integrated with the SoC 230. Using this facility, the DCD 500 may be "plugged in" to the network 120 using the connection 630, while the PC 610 "plugs in" to the DCD 500 using the connection 620 and communicates with the network 120 by going through the switch 603.

In an embodiment, DCD 500 also has a link 152 for connecting to a smartphone 150, as discussed previously in connection with FIG. 1. In some embodiments, this link 152 is wireless and may employ the Bluetooth protocol using a Bluetooth interface 254, or it may employ Wi-Fi or Wi-Fi Direct protocols using a Wi-Fi interface 252.

In an embodiment, DCD 500 performs communication functions, including voice telephony, video telephony, video conferencing, email, and instant messaging. In some embodiments, the display 502 is a touch screen and is used to invoke telephony functions; the keys in a displayed representation of a telephony keypad can be operated by touching the screen, including multi-touch gestures where supported. In some embodiments, the DCD 500 includes a separate telephony keypad/display or touch screen 508 which can be used to invoke and see the status of telephony functions. In some embodiments, the telephony keypad/display or touch screen 508 may have no mechanical keys, just a touch screen. In other embodiments, the touch screen 508 may have a number of mechanical keys, while in other embodiments the telephony keypad/display 508 may have a non-touch display and only mechanical keys. Voice and video calls made through the DCD 500 use the display 502, the video camera 510, telephone handset 512, speakerphone-class speaker 514 and microphone 516, and telephone headset jack 518, as well as other hardware and software resources, as described previously for a generic fit client 140.

Figure 6B:
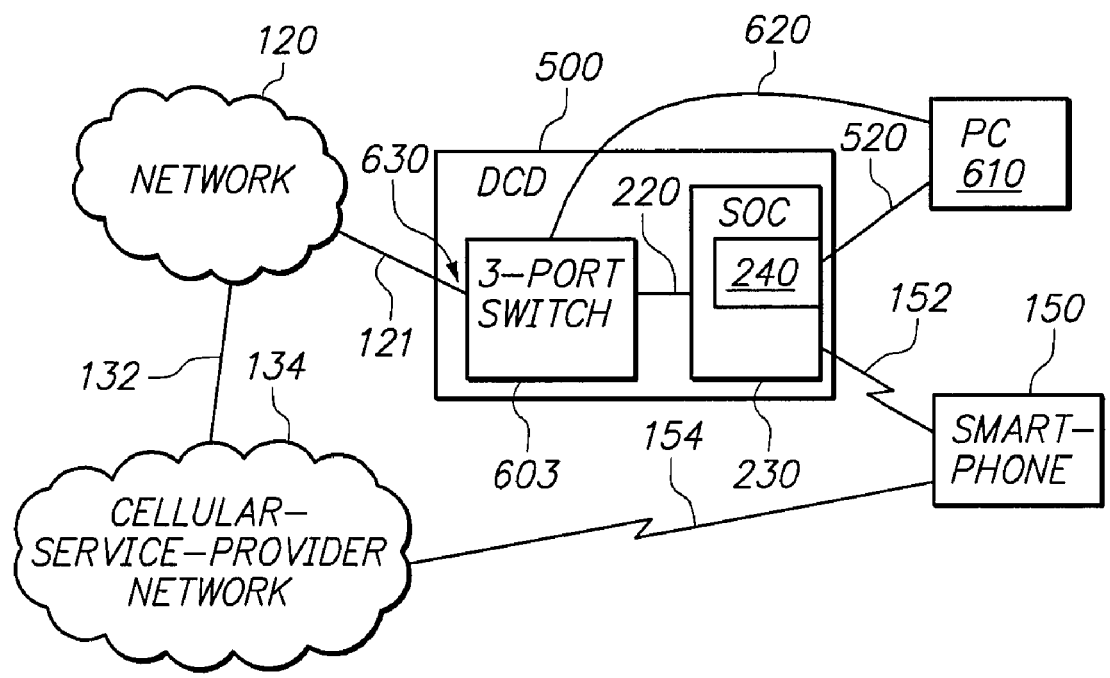
FIG. 6b shows the connection of an alternate fit-client device embodiment to the network and to a conventional PC on an enterprise desktop.

In an embodiment, the SoC 230 in a DCD 500 may have a USB interface 240 that supports a USB connection 520 between the DCD 500 and the PC 610, as shown in FIGS. 6A and 6B. The connection 520 provides direct communication for sharing applications, data, and status between the DCD 500 and the PC 610. Details of such sharing are beyond the scope of the present disclosure.

In many environments, the network connection 121 between the DCD 500 and the network 120 will be wired Ethernet, and in particular powered Ethernet. The IEEE 802.3af Power over Ethernet (PoE) standard can deliver almost 13 watts of power to a desktop device such as a DCD 500, and the IEEE 802.3 at PoE standard delivers up to 25 watts to a desktop. In an embodiment, DCD 500, including an integrated display 502, is powered using PoE. If PoE is not available, or a particular embodiment does not achieve low enough power consumption to use PoE, the DCD 500 can be powered by a conventional power supply.

15.0. Example Notepad Embodiment

Figure 7:
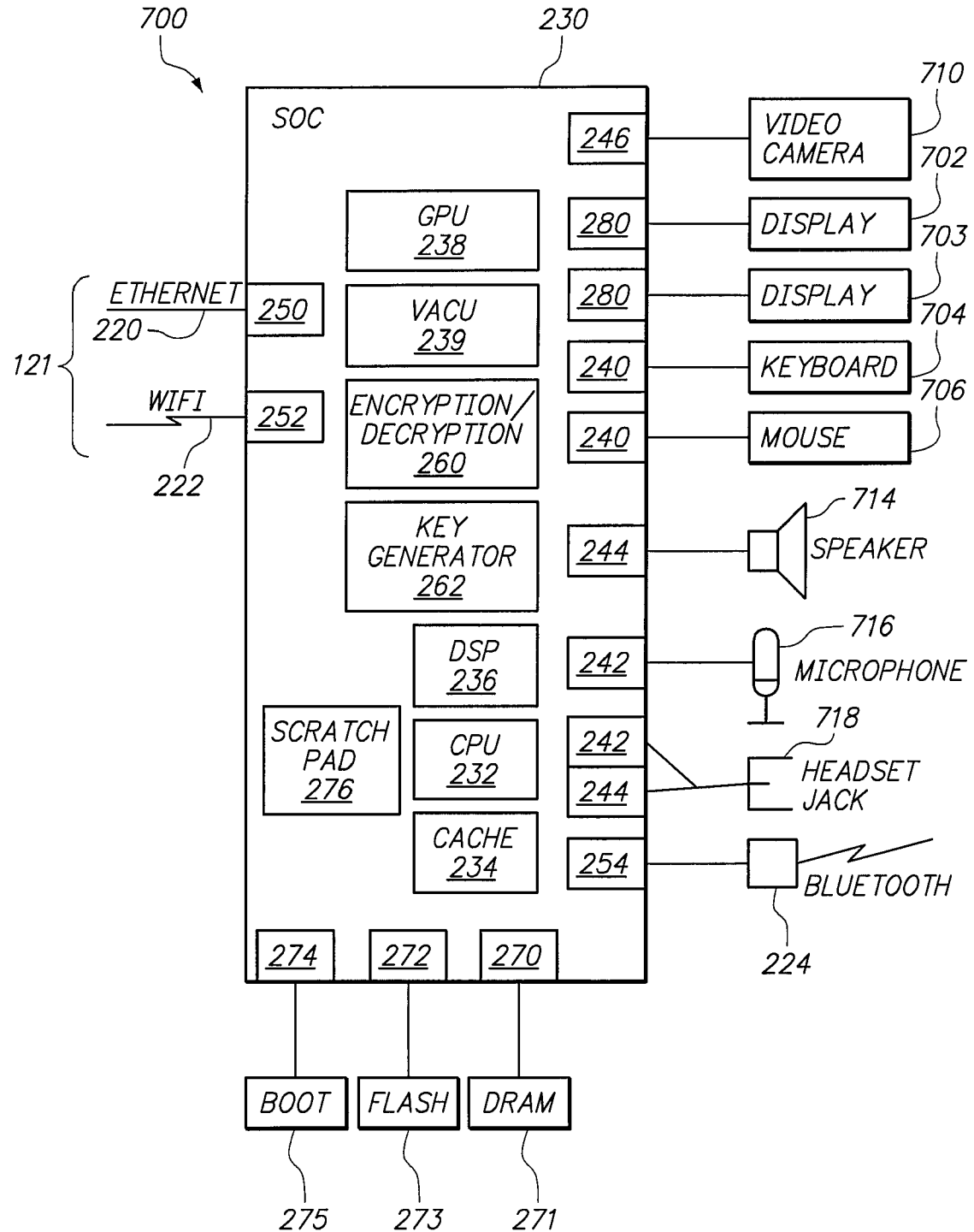
FIG. 7 shows an embodiment of a mobile fit-client device intended to act as a replacement for a laptop computer or notepad/notebook.

FIG. 7 is a block diagram of an embodiment of the fit-client device intended to act as a replacement for a laptop computer or notepad/notebook with printed paper, and to provide a large screen mobile web appliance. In an embodiment, Notepad Device (NPD) 700 works in conjunction with a smartphone 150 and the data center 100 to provide information and communication access. In an embodiment, users of the NPD 700 may include enterprise employees who need to read and annotate documents and who want to run the same applications as on a smartphone 150 but on a larger screen. These users may need to give presentations. In an embodiment, NPD 700, in conjunction with the smartphone 150, removes the need for the user to carry a conventional laptop computer, and may be a more desirable device to use when mobility is required.

In an embodiment, NPD 700 is a portable, battery-powered device with a reasonably sized display 702 capable of showing a full letter/A4 page, allowing easy document reading, annotation, and exchange. The display 702 is integrated in the same housing with the other electronic components of the NPD 700. In some embodiments, the NPD 700 includes a video connector, such as VGA or HDMI, which may be used to connect a second, external display 703 using a cable. In some embodiments, the display 702 or 703 may support touch-screen capability for the user to provide input to the NPD 700.

In an embodiment, NPD 700 supports a keyboard 704, which may be integrated in the same housing as the NPD. The NPD 700 also supports a mouse or other pointing device 706, which in some embodiments connects to the NPD 700 using a conventional USB or wireless interface. In alternative embodiments, the pointing device 706 could be a trackpad, trackpoint, or other device that is integrated in the same housing as the NPD 700. In some embodiments, the display 702 or 703 may support touch-screen capability for the user to provide input to the NPD 700, and in this case, the keyboard 704 and/or the pointing device 706 may be omitted. In preferred embodiments, the NPD 700 also supports a video camera (webcam) 710, speaker 714, microphone 716, and telephone headset jack 718 integrated into the same housing.

In an embodiment, NPD 700 contains a microprocessor system-on-a-chip (SoC) 230 including various functional units and interfaces, and several types of memory, as discussed previously for fit client 140 in connection with FIG. 2.

In an embodiment, NPD 700 has a wired Ethernet connection 220 and/or a wireless Ethernet (Wi-Fi) connection 222 to provide network connectivity 121 as shown previously and discussed in connection with FIGS. 1 and 2. In an embodiment, NPD 700 has a link 152 for connecting to a smartphone 150, as discussed previously in connection with FIG. 1. In preferred embodiments, this link 152 is wireless and may employ the Bluetooth protocol using a Bluetooth interface 254, or it may employ Wi-Fi or Wi-Fi Direct protocols using a Wi-Fi interface 252.

In an embodiment, NPD 700 supports both computation and communication (telephony) functions using any of several ways for a user to invoke and control telephony functions such as placing, receiving, and transferring calls. In an embodiment, NPD 700 supports conventional "softphone" operation, in which a representation of a telephony keypad is presented to the user on a display 702 or 703, and the user can "press" the keys using the keyboard 704 and pointing device 706. In some embodiments, the display 702 or 703 may be a touch screen, in which case the keys in the displayed representation of a telephony keypad can be operated by touching the screen, including multi-touch gestures where supported.

Voice and video calls made through the NPD 700 use the display 702, the video camera 710, speaker 714, microphone 716, and telephone headset jack 718, as well as other hardware and software resources, as described previously for fit client 140.

In an embodiment, the NPD 700 is not assumed to be always connected to the network 120 in normal operation. Because the NPD 700 is a mobile device, the NPD 700 may be used in places where there is no network connection (e.g., on a plane) or where the user is not allowed to connect to the local network (e.g., in a customer's office or lobby). In many cases, a connection may still exist through the smartphone 150 to the cellular-service provider network 134 and from there to one or more internetworks, but such connection may be too slow or too expensive for all desired uses, such as large-scale data transfers. Therefore, in an embodiment, the NPD 700 provides additional resources to handle the cases where network access is limited, impractical, or impossible.

In an embodiment, uses of the NPD 700 when it has little or no network access are expected to be reading, annotating, modifying, and displaying documents, such as word-processing files, presentations, and spreadsheets. In an embodiment, as a fit client the NPD 700 should have little or no permanent state. In an embodiment, during periods of time when it is not connected to the network, the NPD 700 may provide state storage to store the documents that are being read, annotated, modified, and displayed. In an embodiment, NPD 700 is equipped with a larger amount of nonvolatile storage 273 than would be required if it had a full-time connection to the data center 100 through the network 120 or the cellular-service provider network 134. In an embodiment, NPD 700 comprises enough nonvolatile storage 273 to accommodate all of the documents that might be read, annotated, modified, or displayed during a period that it is disconnected from the data center 100. In cases where documents are being modified, NPD 700 provides storage for the modified version(s), and of course all of this nonvolatile storage is in addition what is needed by the OS 320 and local applications 330.

In an embodiment, NPD 700 is stateless in the sense that documents stored in its nonvolatile memory 273 are cached while original versions are stored in the data center 100. In an embodiment, such documents typically remain in the cache for a longer time than they would in a fit client 140 that has a full-time connection to the data center 100. Likewise, in the case that documents are modified or created from scratch using the NPD 700 when it is not connected to the data center 100, these modified or new documents take longer than they would otherwise to be stored in the data center 100; they remain in the NPD 700's nonvolatile memory 273 at least until they are stored in the data center 100.

In an embodiment, NPD 700 provides one or more applications to manage document caching. For example, NPD 700 provides an application whereby the user can specify which documents are to be cached prior to an expected period of disconnection from the data center 100, which will cause such documents to be cached while still connected. The cache management application may also allow the user to specify which documents no longer need to be cached, in order to recover nonvolatile storage space. The cache management application may also use a conventional cache-management algorithm, such as Least Recently Used (LRU), to recover space occupied by documents that have not been accessed on the NPD 700 by the user for a long time.

In an embodiment, NPD 700 also provides an application that keeps track of any modified or new documents that have been created by the NPD 700 user during a period of disconnection from the data center 100, and automatically pushes such documents back to the data center 100 when the NPD 700 is reconnected to the data center 100 via the network 120 or the cellular-service provider network 134. After a period of disconnection from the data center 100, this application must also determine whether any of the currently cached documents are "stale," that is, whether they have been modified at the data center 100 while the NPD 700 was disconnected. The document management application may also address consistency issues that may arise when a document can be modified in two different places, as discussed for keyring files previously.

In an embodiment, NPD 700 may have documents and other information stored in its nonvolatile memory 273 but that information may be unreadable. As discussed previously, stored information is encrypted, and can be read in its original, unencrypted form only after being decrypted using a key. In an embodiment, NPD 700 may have new or modified information cached in its nonvolatile memory 273 that has not yet been pushed back to the data center 100. NPD 700 may also have other, unmodified but cached information which the user requested to remain accessible during an extended period of disconnection from the data center 100, even after the user has been temporarily absent or logged out during this extended period.

Thus, in an embodiment, although the NPD 700 renders cached information unreadable when the user becomes not present or after a logout as described previously, the NPD 700 can restore the readability of such information when the user becomes present or logs in again. In an embodiment, restoration may be performed by software running in the NPD 700 or in cooperation with the smartphone 150, as described previously. That is, in both cases, cached information is encrypted when stored in the nonvolatile memory 273, and an encryption key must be used to access the cleartext data. In the first case, as described previously, the NPD 700 is configured to prevent an attacker from gaining access to the stored encryption key and thereby viewing or stealing the cleartext data. In the second case, the NPD 700 periodically erases its stored copy of the encryption key, which must be refreshed from the smartphone 150 which also stores a copy.

In an embodiment, the NPD 700 may be used to show a presentation that may be retrieved from the data center 100 or from the nonvolatile storage 273. In embodiments that include a video connector, the external display 703 may be replaced by a standard projector to allow the presentation to be shown. In other embodiments, or to allow presentations to be made when an external standard projector is not available, the NPD 700 may incorporate a pico-projector allowing a presentation to be projected without the need for external components. The pico-projector is incorporated into the mechanical design of the NPD in a way that is unobtrusive when the device is carried by the user, but which allows the pico-projector to be placed correctly for projecting. In an embodiment using either projection technique, the display 702 is still available for the presenter to control the flow of the presentation and to make notes and annotations that are not projected.

In an embodiment, the network connection 121 between the mobile NPD 700 and the network 120 may be wired Ethernet, and in particular powered Ethernet. The IEEE 802.3af Power over Ethernet (PoE) standard can deliver almost 13 watts of power to a device such as a NPD 700, and the IEEE 802.3 at PoE standard delivers up to 25 watts. Thus, in some embodiments, the NPD 700's battery can be charged using the PoE connection. In an embodiment, the battery can also be charged by a conventional power converter or "brick" plugged into AC power or a mobile DC source such as a car's 12-volt outlet.

16.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
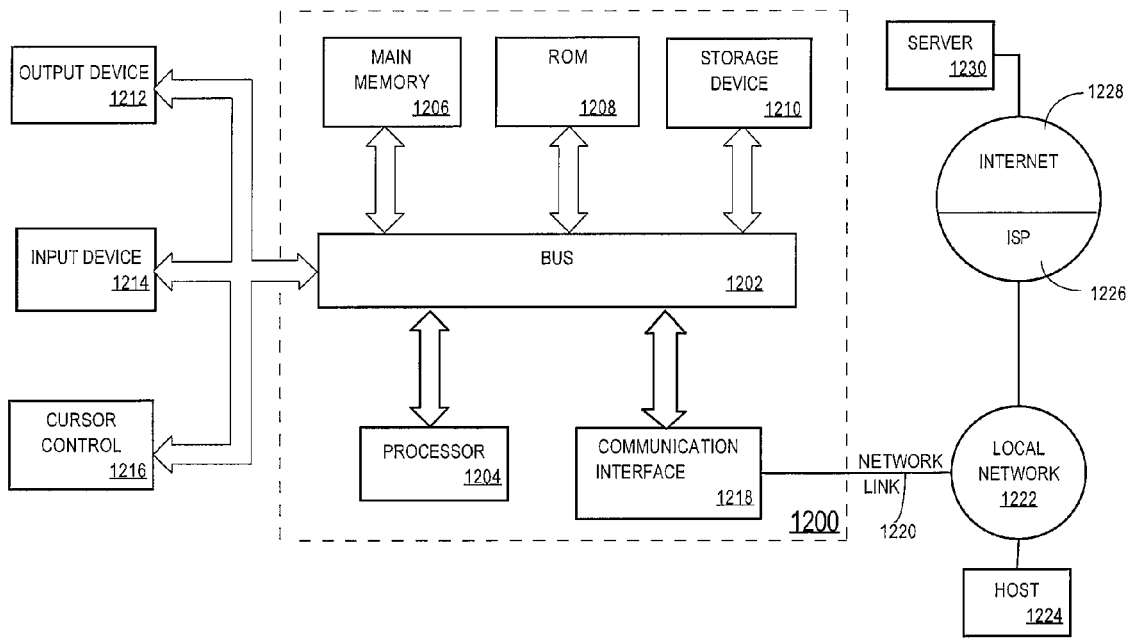
FIG. 12 is block diagram of a computer system upon which embodiments of the invention may be implemented.

For example, FIG. 12 is a block diagram that illustrates a computer system 1200 upon which an embodiment of the invention may be implemented. Computer system 1200 includes one or more busses 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to one or more output devices 1212, for presenting information to a computer user. For example, output device 1212 may be a Liquid-Crystal Display (LCD), touch panel, Light-Emitting Diode (LED), audio speaker, and so forth. One or more input devices 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Other types of input devices 1204 may include devices equipped to accept, for example, audio, video, tactile, and other types of input. Such devices may include microphones and other audio ports, video capture ports, cameras, fingerprint readers, barcode scanners, touch-sensitive panels, accelerometers, global position system (GPS) units, and so forth. Output device 1212, input device 1204, and any other component of computer system 1200 may be coupled to bus 1202 through any suitable connection, including wired and/or wireless connections.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes one or more communication interfaces 1218 coupled to bus 1202. Communication interface 1218 provides a two-way data communication coupling to a network link 1220 that is connected to a network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented to access wireless personal, local, or service-provider cellular networks such as Bluetooth, Wi-Fi, WiMax, CDMA, GSM, 3G, or 4G. In any such implementation, communication interface 1218 sends and receives electrical, electromagnetic or optical signals that carry digital data streams representing various types of information.

Computer system 1200 may feature multiple communication interfaces 1218, each coupled to a different network link 1220 connected to a same or different network 1222. For example, computer system 1200 may be connected via one communication interface 1218 to a Bluetooth Personal Area Network (PAN) 1222, via another communication interface 1218 to a WiMax network 1222, and via yet another communication interface to a LAN.

Network link 1220 may provide data communication through one or more networks to other data devices. For example, network link 1220 may provide a connection through network 1222 to a host computer 1224 or to data equipment operated by an Internet Service Provider (ISP) 1226. ISP 1226 in turn provides data communication services through the world wide packet data communication network now commonly referred to as the "Internet" 1228. Network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

17.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors;
   a presence detection component configured to detect the presence of a second device;
   an authentication component configured to authenticate a user based at least on identifying information provided by the second device;
   a resource location component configured to locate one or more applications on a third device based at least on resource access information provided by the second device;

an application component configured to cause the one or more processors to provide the user with access to the one or more applications on the third device, while the second device remains in the presence of the apparatus, in response to the authentication component successfully authenticating the user and the resource location component successfully locating the one or more applications;

one or more memories configured to store, in encrypted form, data related to the user's use of the one or more applications; and an encryption component for encrypting the encrypted data;

wherein the one or more memories are further configured to store a key for reading the encrypted data;

wherein the encryption component is configured to erase the key upon the occurrence of a certain condition;

wherein the condition is one of the failure of the presence detection component to detect the particular device after a certain period of time; the receipt of signal information indicating that the strength of the second device's connection to a certain wireless network has fallen below a certain threshold; the failure of the encryption component to receive, from the second device, a copy of the key after a predetermined period of time.

2. The apparatus of claim 1, wherein the resource location component is further configured to store user data at the apparatus; wherein the user data is either or both received from the second device or retrieved based on at least a lookup operation involving at least a portion of the resource access information; wherein the application component is configured to cause the one or more processors to provide the user with access to the one or more applications using the user data.

3. The apparatus of claim 2, further comprising a synchronization component configured to synchronize the user data, upon modification at the apparatus, with one or both of the second device and the third device.

4. The apparatus of claim 2, wherein the application component is configured to render the user data unreadable upon the occurrence of a certain condition; wherein the condition is one of the failure of the presence detection component to detect the particular device after a certain period of time, or the receipt of signal information indicating that the strength of the second device's connection to a certain network has fallen below a certain threshold.

5. The apparatus of claim 2, wherein the user data includes one or more of: application preferences, contact information, calendaring information, email account information, messages, call histories, bookmark information, browsing histories, or cookies.

6. The apparatus of claim 1, wherein the resource location component is configured to locate the one or more applications based on at least access instructions for a particular application of the one or more applications; wherein the access instructions are either: (a) included in the resource access information, or (b) located by the resource location component based at least on a lookup operation involving at least a portion of the resource access information.

7. The apparatus of claim 6, wherein the access instructions specify a location of code for the particular application; wherein the application component is configured to cause the one or more processors to provide the user with access to the particular application by causing the one or more processors to execute the code for the particular application.

8. The apparatus of claim 6, wherein the access instructions specify a location of the third device that hosts the particular application; wherein the application component is configured to cause the one or more processors to provide the user with access to the particular application by causing the one or more processors to (1) execute a client for interfacing with the particular application at the third device; and (2) direct the client to the particular application.

9. The apparatus of claim 1, wherein the identifying information comprises credentials for the user.

10. The apparatus of claim 9, wherein the authentication component is further configured to provide the credentials to the one or more applications.

11. The apparatus of claim 1, wherein the authentication component is further configured to authenticate the user by requesting additional credentials from the user.

12. The apparatus of claim 1, wherein the resource access information further includes executable code for a particular application of the one or more applications.

13. The apparatus of claim 1,
wherein the one or more applications are one or more applications that rely on particular user data;
wherein the particular user data is also relied upon by a second set of one or more applications the user has accessed through the second device.

14. The apparatus of claim 1, wherein the presence detection component is configured to detect the presence of the second device based on at least one or more of the strength of a communication link between a first communication interface at the apparatus and a second communication interface at the second device, wherein the communication link is wired or wireless; a proximity calculation based at least upon physical location information provided by the second device; or an analysis of information gathered from one or more sensors coupled to the apparatus.

15. The apparatus of claim 1, wherein the second device is a device that provides the user with additional functionality unrelated to any functionality provided by the apparatus.

16. The apparatus of claim 1, wherein the second device is a device that is uniquely associated with the user.

17. The apparatus of claim 1, wherein the second device is a mobile phone.

18. The apparatus of claim 1, wherein the third device is a server.

19. The apparatus of claim 1, wherein the one or more applications are executable applications.

20. A method comprising:
detecting, at a first device, the presence of a second device;
while the first device remains in the presence of the second device: the first device authenticating a user based at least on identifying information provided by the second device; the first device receiving resource access information from the second device; based at least on the resource access information provided by the second device, the first device locating one or more applications on a third device; upon successfully authenticating the user and locating the one or more applications, the first device providing the user with access to the one or more applications on the third device;
wherein the method is performed by one or more computing devices;
wherein the first device includes:
one or more memories configured to store, in encrypted form, data related to the user's use of the one or more applications; and
an encryption component for encrypting the encrypted data;
wherein the one or more memories are further configured to store a key for reading the encrypted data;

wherein the encryption component is configured to erase the key upon the occurrence of a certain condition;

wherein the condition is one of the failure of the presence detection component to detect the particular device after a certain period of time; the receipt of signal information indicating that the strength of the second device's connection to a certain wireless network has fallen below a certain threshold; the failure of the encryption component to receive, from the second device, a copy of the key after a predetermined period of time.

21. One or more non-transitory computer-readable media storing one or more instructions that, when executed by one or more processors, cause performance of:

detecting, at a first device, the presence of a second device;

while the first device remains in the presence of the second device: the first device authenticating a user based at least on identifying information provided by the second device; the first device receiving resource access information from the second device; based at least on the resource access information provided by the second device, the first device locating one or more applications on a third device; upon successfully authenticating the user and locating the one or more applications, the first device providing the user with access to the one or more applications on the third device;

wherein the first device includes:

one or more memories configured to store, in encrypted form, data related to the user's use of the one or more applications; and an encryption component for encrypting the encrypted data;

wherein the one or more memories are further configured to store a key for reading the encrypted data;

wherein the encryption component is configured to erase the key upon the occurrence of a certain condition;

wherein the condition is one of the failure of the presence detection component to detect the particular device after a certain period of time; the receipt of signal information indicating that the strength of the second device's connection to a certain wireless network has fallen below a certain threshold; the failure of the encryption component to receive, from the second device, a copy of the key after a predetermined period of time.

\* \* \* \* \*